(12) United States Patent
Tokiwa et al.

(10) Patent No.: US 7,235,891 B2
(45) Date of Patent: Jun. 26, 2007

(54) POWER SYSTEM HAVING GENERATOR DRIVEN BY ENGINE

(76) Inventors: Masayoshi Tokiwa, 1-32, Chayamachi, Kita-ku, Osaka-shi (JP) 530-0013; Shinji Hibi, 1-32, Chayamachi, Kita-ku, Osaka-shi (JP) 530-0013; Kotaro Nakamura, 801, Minamifudodo-cho, Horikawahigashiiru, Shiokoji-dori, Shimogyo-ku, Kyoto-shi (JP) 600-8530; Masao Mabuchi, 801, Minamifudodo-cho, Horikawahigashiiru, Shiokoji-dori, Shimogyo-ku, Kyoto-shi (JP) 600-8530; Nobuyuki Toyoura, 801, Minamifudodo-cho, Horikawahigashiiru, Shiokoji-dori, Shimogyo-ku, Kyoto-shi (JP) 600-8530; Kenichi Inoue, 801, Minamifudodo-cho, Horikawahigashiiru, Shiokoji-dori, Shimogyo-ku, Kyoto-shi (JP) 600-8530; Katsutaka Tanabe, 801, Minamifudodo-cho, Horikawahigashiiru, Shiokoji-dori, Shimogyo-ku, Kyoto-shi (JP) 600-8530; Yasuyuki Okoba, 801, Minamifudodo-cho, Horikawahigashiiru, Shiokoji-dori, Shimogyo-ku, Kyoto-shi (JP) 600-8530

( * ) Notice: Subject to any disclaimer, the term of this patent is extended or adjusted under 35 U.S.C. 154(b) by 315 days.

(21) Appl. No.: 10/641,030

(22) Filed: Aug. 15, 2003

(65) Prior Publication Data

US 2004/0032127 A1    Feb. 19, 2004

Related U.S. Application Data

(63) Continuation of application No. pct/jp02/01053, filed on Feb. 7, 2002.

(30) Foreign Application Priority Data

| Feb. 16, 2001 | (JP) | 2001-040356 |
| Feb. 22, 2001 | (JP) | 2001-046545 |
| Feb. 22, 2001 | (JP) | 2001-046546 |
| Feb. 22, 2001 | (JP) | 2001-046548 |

(51) Int. Cl.
*B60L 11/02* (2006.01)
*B61C 9/38* (2006.01)
*H02K 23/52* (2006.01)
*H02J 7/14* (2006.01)
*H02P 9/14* (2006.01)

(52) U.S. Cl. .......................... 290/10; 322/28; 363/61; 363/67; 363/69; 363/87

(58) Field of Classification Search .................. 290/10; 322/28; 363/61, 67, 69, 87, 89
See application file for complete search history.

(56) References Cited

U.S. PATENT DOCUMENTS

| 2,575,716 | A | * | 11/1951 | Kilgore | 318/771 |
| 2,655,602 | A | * | 10/1953 | Kuhn | 290/4 R |
| 3,047,724 | A | * | 7/1962 | Neufville et al. | 290/4 R |
| 3,308,363 | A | * | 3/1967 | Rawcliffe et al. | 318/773 |
| 3,340,448 | A | * | 9/1967 | Thiessen | 318/140 |
| 3,769,570 | A | * | 10/1973 | Stairs | 363/3 |
| 3,949,254 | A | * | 4/1976 | Woll et al. | 310/198 |
| 4,058,759 | A | * | 11/1977 | Halfhill | 322/13 |
| 4,152,630 | A | * | 5/1979 | Wanlass | 318/796 |
| 4,187,457 | A | * | 2/1980 | Wanlass | 318/729 |
| 4,275,311 | A | * | 6/1981 | Agazzone et al. | 290/2 |
| 4,315,163 | A | * | 2/1982 | Bienville | 307/66 |
| 4,328,429 | A | * | 5/1982 | Kublick | 307/58 |
| 4,367,522 | A | * | 1/1983 | Forstbauer et al. | 363/137 |
| 4,484,125 | A | * | 11/1984 | Hertz | 318/768 |
| 4,539,486 | A | * | 9/1985 | Saito et al. | 307/34 |
| 4,701,692 | A | * | 10/1987 | Takeuchi et al. | 322/90 |
| 4,739,466 | A | * | 4/1988 | Glennon et al. | 363/89 |
| 4,761,602 | A | * | 8/1988 | Leibovich | 318/316 |
| 4,792,740 | A | * | 12/1988 | Smith | 318/768 |
| 4,808,835 | A | * | 2/1989 | Tsuji et al. | 290/4 A |
| 4,808,868 | A | * | 2/1989 | Roberts | 310/68 R |
| 4,866,591 | A | * | 9/1989 | Cook et al. | 363/67 |
| 4,896,063 | A | * | 1/1990 | Roberts | 310/68 R |
| 4,937,723 | A | * | 6/1990 | Rozman et al. | 363/51 |

| | | | | |
|---|---|---|---|---|
| 4,959,573 A * | 9/1990 | Roberts | 310/68 R |
| 4,985,670 A * | 1/1991 | Kaneyuki et al. | 322/28 |
| 5,038,095 A * | 8/1991 | Kirchberg et al. | 322/58 |
| 5,065,305 A * | 11/1991 | Rich | 363/150 |
| 5,068,587 A * | 11/1991 | Nakamura et al. | 318/771 |
| 5,083,039 A * | 1/1992 | Richardson et al. | 290/44 |
| 5,134,332 A * | 7/1992 | Nakamura et al. | 310/208 |
| 5,177,677 A * | 1/1993 | Nakata et al. | 363/89 |
| 5,267,137 A * | 11/1993 | Goebel | 363/87 |
| 5,300,870 A * | 4/1994 | Smith | 318/768 |
| 5,329,221 A * | 7/1994 | Schauder | 323/207 |
| 5,406,470 A * | 4/1995 | Ridley et al. | 363/69 |
| 5,449,962 A * | 9/1995 | Shichijyo et al. | 310/184 |
| 5,625,539 A * | 4/1997 | Nakata et al. | 363/17 |
| 5,691,590 A * | 11/1997 | Kawai et al. | 310/180 |
| 5,710,531 A * | 1/1998 | Abolafia | 335/216 |
| 5,719,486 A * | 2/1998 | Taniguchi et al. | 322/28 |
| 5,804,953 A * | 9/1998 | Bowyer et al. | 323/256 |
| 5,892,354 A * | 4/1999 | Nagao et al. | 323/299 |
| 5,920,467 A * | 7/1999 | Bowyer et al. | 363/37 |
| 5,973,481 A | 10/1999 | Thompson et al. | 322/7 |
| 6,058,035 A * | 5/2000 | Madenokouji et al. | 363/95 |
| 6,111,767 A * | 8/2000 | Handleman | 363/95 |
| 6,144,136 A * | 11/2000 | Umeda et al. | 310/254 |
| 6,163,138 A * | 12/2000 | Kohl et al. | 322/28 |
| 6,229,722 B1 * | 5/2001 | Ichikawa et al. | 363/71 |
| 6,239,997 B1 * | 5/2001 | Deng | 363/95 |
| 6,256,213 B1 * | 7/2001 | Illingworth | 363/89 |
| 6,331,760 B1 * | 12/2001 | McLane, Jr. | 318/767 |
| 6,339,316 B1 * | 1/2002 | Eguchi et al. | 322/59 |
| 6,356,041 B1 * | 3/2002 | Smith | 318/34 |
| 6,417,592 B2 * | 7/2002 | Nakamura et al. | 310/184 |
| 6,490,176 B2 * | 12/2002 | Holzer et al. | 363/20 |
| 6,522,030 B1 * | 2/2003 | Wall et al. | 307/43 |
| 6,552,463 B2 * | 4/2003 | Oohashi et al. | 310/207 |
| 6,788,029 B1 * | 9/2004 | Gabrys | 322/4 |
| 6,788,031 B2 * | 9/2004 | Pendell | 322/44 |
| 6,831,374 B2 * | 12/2004 | Seki | 290/44 |
| 6,856,057 B2 * | 2/2005 | Kobayashi et al. | 310/71 |
| 6,894,410 B2 * | 5/2005 | Kobayashi et al. | 310/71 |
| 6,897,581 B2 * | 5/2005 | Doherty et al. | 310/52 |
| 6,909,263 B2 * | 6/2005 | Xu et al. | 322/29 |
| 6,930,418 B2 * | 8/2005 | Kobayashi et al. | 310/71 |
| 6,979,979 B2 * | 12/2005 | Xu et al. | 322/59 |
| 7,068,524 B2 * | 6/2006 | Nakagawa et al. | 363/67 |
| 7,098,629 B2 * | 8/2006 | Iijima et al. | 322/25 |
| 2005/0264266 A1 * | 12/2005 | Nakagawa et al. | 322/25 |
| 2005/0264961 A1 * | 12/2005 | Ogawa et al. | 361/20 |

FOREIGN PATENT DOCUMENTS

| | | |
|---|---|---|
| JP | 61-128770 | 6/1986 |
| JP | 5-308799 | 11/1993 |
| JP | 8-111939 | 4/1996 |
| JP | 10-42472 | 2/1998 |
| JP | 11-296244 | 10/1999 |

OTHER PUBLICATIONS

English Language International Search Report for International Application No. PCT/JP02/01053, dated Apr. 23, 2002.
Supplemental European Search Report for EP Application No. EP 02-71-1391, European Patent Office, Munich, dated Apr. 8, 2005.
Patent Abstracts of Japan, English language abstract for JP 61-128770.

* cited by examiner

*Primary Examiner*—Darren Schuberg
*Assistant Examiner*—Pedro J. Cuevas
(74) *Attorney, Agent, or Firm*—Sterne, Kessler, Goldstein & Fox P.L.L.C.

(57) ABSTRACT

An apparatus for controlling the operation of power conditioners (10) for supplying the generated power to an external power system such as a commercial power system, in which power conditioners (10) are interconnected to an external power system, the power conditioners (10) are interconnected through information exchange means, at least one of the power conditioners (10) monitors the reverse power flow, and the power conditioners (10) exchange the monitor information with information of the other power conditioners (10), thereby equalizing the outputs of all the power conditioners (10). A generator (42) has armature windings (60), and an inverter circuit (13) of the power conditioner (10) provided for each of the armature windings (60) is controlled by cable or radio.

15 Claims, 18 Drawing Sheets

POWER SYSTEM HAVING GENERATOR DRIVEN BY ENGINE

This application is a continuation of the international application number PCT JP02/01053, filed Feb. 7, 2002, (status pending).

BACKGROUND OF THE INVENTION

1. Field of the Invention

The invention relates to an electric power system having a generator driven by an engine and power conditioners, and enabled to supply individual electric power generated by the generator and external electric power to load by connecting an output wire of the generator with an external electric power system such as a commercial electric power system through the power conditioners. Especially, it relates to operation control construction of the power conditioners, connection construction of inverter circuits of the power conditioners, and connection construction of multiple electric power systems.

2. Related Art

In recent, a gas cogeneration system attracts public attention as a kind of independent power generation systems. It is a system which provides electric power generated from fuel of natural gas, and recovers waste heat for heating water or the like.

The system comprises: a generator for converting fuel energy into electric energy; a electric power conversion device (an inverter circuit) for converting electric power from the generator into alternating-current power synchronized with an external electric power source such as a commercial electric power source; a protection device for detecting the abnormalities of the external electric power source; and a waste heat recovery device for recovering waste heat. A power conditioner is constituted by the electric power conversion device and the protection device.

When the electric power generated by the gas cogeneration system causes reverse power flow, the efficiency of power generation falls. Therefore, functions for detecting and preventing the reverse power flow are needed.

For increasing the capacity of an electric power system such as the gas cogeneration system, enlarging capacity of the inverter circuit poses a problem in respect of retaining the system compact. Then, it may be considered that multiple power conditioners (namely, multiple inverter circuits) are connected to the external electric power system.

However, when connecting multiple power conditioners (multiple inverter circuits) to the external electric power such as a commercial electric power system, all the power conditioners are required to detect the reverse power flow. Also, it is important to prevent inequality of output among the power conditioners, and to ensure a compact interconnection structure among the inverter circuits of the power conditioners simply and inexpensively.

Furthermore, when a plurality of the electric power systems are provided, it is necessary to equalize operation of the systems.

SUMMARY OF THE INVENTION

The invention is accomplished considering the above-mentioned problem. A first object of the invention is to provide an electric power system whose capacity is increased without spoiling its compactness.

Therefore, according to the invention, an electric power system having a generator driven by an engine comprises: multiple armature windings provided in the generator; inverter circuits provided to the respective armature windings; and a wire for generated independent electric power connected to the downstream side of each of the inverter circuits and connected to an external wire which connects an external electric power source to a consumer.

Accordingly, the inverter circuits provided to the respective armature windings are miniaturized. Therefore, the electric power system having great capacity can be constructed compactly.

Furthermore, the invention having the multiple inverter circuits provides a construction for controlling operation of the inverter wherein the inverter circuits is prevented from causing the reverse power flow so as to ensure efficient control of generated electric power, and output powers of the inverter circuits are leveled so as to equalize the availabilities and lives of the systems.

Therefore, according to the present invention, the above-mentioned electric power system having the multiple inverter circuits provided to the respective armature windings comprises: means for detecting voltage in the external wire; means for detecting voltage outputted from each of the inverter circuits; means for detecting current outputted from each of the inverter circuits; and a controller for controlling each of the inverter circuits based on voltage in the external wire, voltage in each of the inverter circuits, and current in each of the inverter circuits.

Accordingly, individual output is controlled based on the voltage in the external wire so as to be supplied under the voltage harmonized with the voltage in the external wire. The individual output is also controlled based on the voltage and current of the individual output itself, thereby preventing excessive operation.

Especially, for the controller, the electric power system is provided with a main controller which calculates electric power of the external wire based on current and voltage of the external wire; and controllers each of which calculates output electric power of each of the inverter circuits based on current and voltage of each of the inverter circuits. The main controller communicates with each of the controllers so as to control each of the inverter circuits, thereby equalizing individual output electric power of the inverter circuits based on the electric power of the external wire and the output electric power of each of the inverter circuits.

Accordingly, each inverter circuit always functions equally. Thus, the inverter circuits uniformly deteriorate with a passage of time so as to match the periods thereof for maintenance.

Furthermore, the electric power system is so constructed that the main controller controls each of the inverter circuits so as to make current flow in the external wire toward the consumer.

Accordingly, the inverter circuits are controlled so that current flows in the external wire to the consumer. Namely, reverse power flow to the external electric power source can be prevented.

Moreover, the electric power system is constructed so that the main controller communicates with the respective controllers through communication lines of a multidrop style.

Accordingly, the main inverter controller is connected to the other inverter controllers through simple communication wirings, thereby reducing manpower for maintenance.

In the case that a plurality of the electric power systems having the above-mentioned various constructions are provided, there are provided a system controller for controlling start and stop of each of the electric power systems, and a main system circuit controller for calculating electric power in the external wire based on voltage and current of the external wire. The main system circuit controller communicates with the system controllers and controls each of the systems so as to equalize total operation status of the systems based on the electric power in the external wire.

Due to this construction, operation of each electric power system is equalized. Thus, total operation status is leveled among the electric power systems so that the electric power systems equally deteriorate with a passage of time, thereby matching the periods thereof for maintenance.

DETAILED DESCRIPTION OF THE INVENTION

Figure 1:
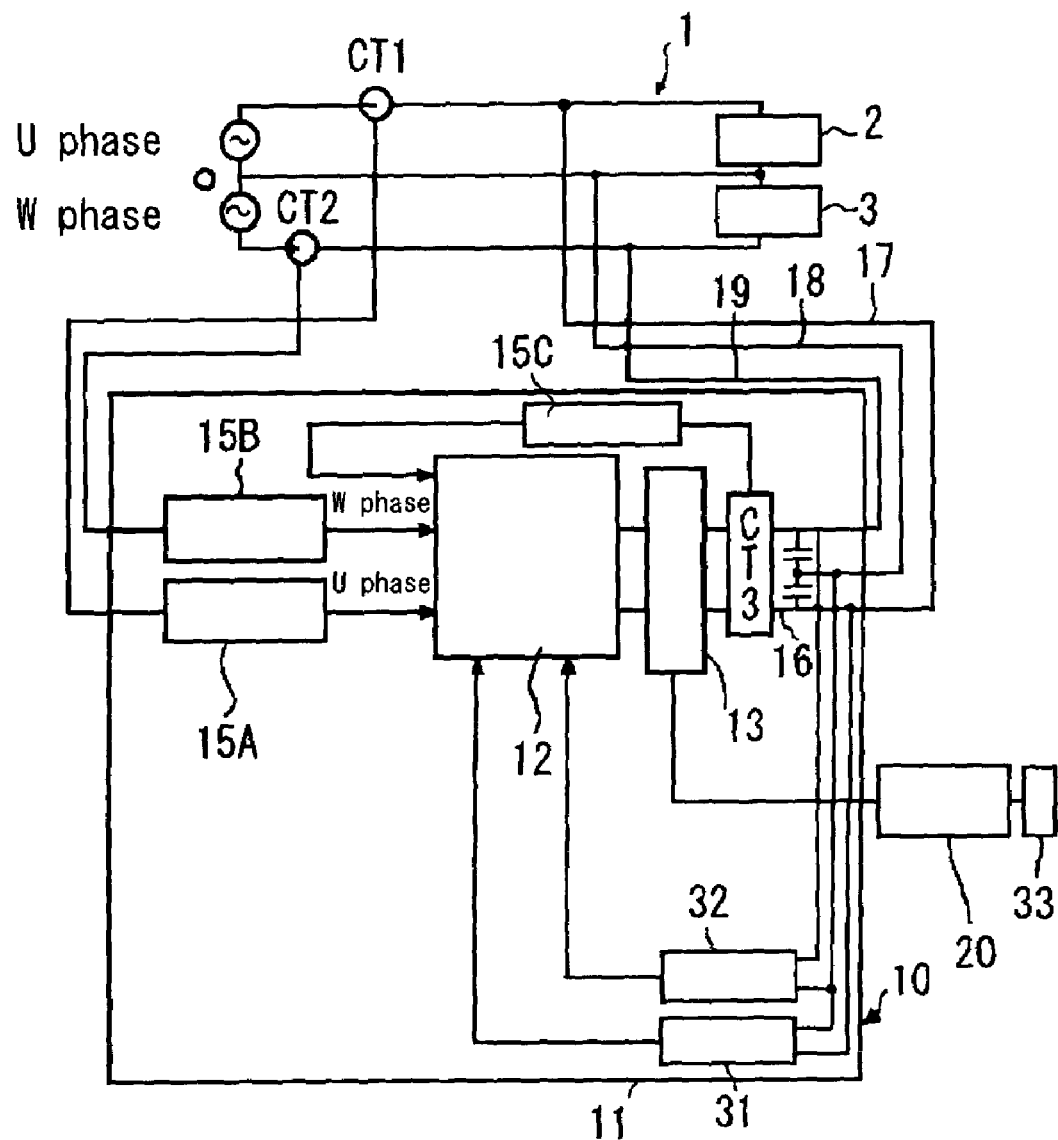
FIG. 1 is a diagram illustrating a construction of a power conditioner in an interconnection system.

Best Mode for Carrying Out the Invention

Embodiment 1

An apparatus for controlling the operation of power conditioners according to the invention is provided for power conditioners having a generation system generating electric power in association with an external electric power system such as a commercial electric power system. The power conditioners are interconnected to the external electric power system, and mutually interconnected through information exchanging means. At least one of the power conditioners monitors the reverse power flow. The power conditioners exchange the monitor information with information of the other power conditioners. Accordingly, outputs of all of the power conditioners are equalized.

Each of the power conditioners is provided with a transmitter-and-receiver and a communication medium which serve as the information exchanging means. The transmitter-and-receiver is connected through the communication medium to the transmitter-and-receiver of another power conditioner. As the communication medium, a cable or radio communication line for parallel system arrangement may be provided.

Due to the construction, the multiple power conditioners are interconnected mutually through the information exchanging means. The information of the power conditioners, such as the amount of output electric power or operational state, is exchanged. Based on this information, the power conditioners control the amount of their output powers so as to prevent the reverse power flow.

This information is transmitted to all of the power conditioners through the communication mediums (the cable or radio communication lines for parallel system arrangement). Due to this, control of their output powers corresponding to the reverse power flow is equalized.

By equalizing output power among the power conditioners, the availability and life of the system can be equalized.

By connecting the multiple power conditioners mutually, a mass system may be built easily.

The mass system may be built on the basis of at least one of the power conditioners so that the capacity of the system may be easily changed by addition of a power conditioner. The system can be modified more easily by using connectors as their connecting portions.

By using the communication lines for parallel system arrangement, even when a power conditioner is added, it is not necessary to add an electric power detector, thereby reducing cost.

The system can be modified more easily by using a radio system as the communication medium.

With respect to an apparatus for operation control of the power conditioners according to the invention, the power conditioner which monitors the reverse power flow (hereinafter, the monitoring power conditioner) comprises: electric power conversion means for converting electric power from a generator into alternating-current power synchronized with the external electric power source; respective signal input means for U phase line and W phase line for inputting detected signal from respective electric power detectors for detecting the direction and amount of currents flowing in U phase line and W phase line of the external electric power system; an output current detector for detecting the amount of output current from the electric power conversion means; respective voltage input means for U phase line and W phase line for inputting voltages of U phase line and W phase line of the external electric power system as detected signals; a transmitter-and-receiver for transmitting output information about the amount of its output electric power, its status information and the monitored electric power of reverse power flow, and for receiving input information about state and output electric power of each of the power conditioners which do not monitor the reverse power flow (hereinafter, the non-monitoring power conditioners); and a controller for detecting the reverse power flow by receiving signals from the signal input means, the output current detection means and the voltage input means, and for controlling the electric power conversion means based on the input information to restrict output electric power of the power conditioners.

Each of the non-monitoring power conditioners comprises: electric power conversion means for converting electric power from a generator into alternating-current power synchronized with the external electric power source; an output current detector for detecting the amount of output current from the electric power conversion means; respective voltage input means for U phase and W phase for inputting respective voltages of U phase line and W phase line of the external electric power system as detected signals; a transmitter-and-receiver for receiving respective output informations of the monitoring power conditioner and the other non-monitoring power conditioners, and for transmitting its output information about its status and its output electric power; and a controller for controlling the electric power conversion means based on the signals from the output current detector and the voltage input means and the output informations of the monitoring power conditioner and the other non-monitoring power conditioners so as to restrict its output electric power.

Due to the construction, while the monitoring power conditioner is provided with the respective signal input means for U phase and W phase for inputting the detected signals from the respective electric power detectors for detecting the direction and amount of currents flowing in U phase line and W phase line of the external electric power system, the non-monitoring power conditioners which do not detect the reverse power flow require none of such signal input means.

Only the monitoring power conditioner requires current detectors (CT) as the electric power detection means which detect reverse power flow, and the other power conditioners do not require respective current detectors (CT). Therefore, the number of current detectors (CT) can be reduced.

The power generation system comprises a gas engine and a generator driven by the gas engine, for example. The electric power conversion means is, for example, an inverter. The current detector is, for example, a CT (current transformer). The signal input means is, for example, a CT input circuit (AD converter). The output current detector is, for example, a CT (current transformer) serving as a measuring device for measuring the output current. The voltage input means is a voltage input circuit (AD converter) or the like. The controller is, for example, MPU. As the status information, a synchronous signal for detecting independent operation, operation state or the like are provided.

The apparatus for operation control of the power conditioners according to the invention may further comprise external input/output means connected to the at least one of the multiple power conditioners.

When the external input/output means is connected to the power conditioner in this way, the communication lines for parallel system arrangement are available for obtaining information of all of the power conditioners.

The communication lines for parallel system arrangement are also used for transmitting command signals so as to determine set values of the power conditioners, so that all the power conditioners can be set up through an arbitrary power conditioner.

The external input/output means may be a personal computer or the like.

A method for controlling the operation of power conditioners according to the invention is provided for power conditioners interconnecting electric power generated by a power generation system to an external electric power system. At least one of the multiple power conditioners is linked with the external electric power system so as to monitor the reverse power flow. The monitor information is exchanged with information of the other power conditioners for controlling all of the power conditioners so as to equalize their output powers.

By exchanging information between the power conditioners connected mutually and providing information for controlling output based on the exchanged information, the reverse power flow is prevented.

Since the information is transmitted to all of the power conditioners, control of output corresponding to electric power of the reverse power flow is equalized.

Accordingly, output powers of the power conditioners are equalized so as to equalize the availability and life of the system.

EXAMPLE 1-1

Hereinafter, description will be given on an example of the invention according to drawings.

As shown in FIG. 1, an interconnection system having a power conditioner 10, which associates electric power generated by an electric power generation system 20 with an external electric power system 1 such as a commercial electric power system, controls for restricting output electric power of the power conditioner 10 when the reverse power flow is detected.

The power conditioner 10 comprises an inverter circuit 13 for converting electric power from the electric power generation system 20 into alternating-current power synchronized with the power from the external electric power source; respective CT input circuits 15A and 15B for U phase line and W phase line for inputting detected signals from respective current detectors (AD converters) CT1 and CT2 for detecting direction and amount of respective current flowing in U phase line and W phase line of the external electric power system 1; an output current measuring device (a current transformer) CT3 for detecting an amount of output current from the inverter circuit 13; a CT input circuit (an AD converter) 15C for inputting the detected signal from the output current measuring device CT3; respective voltage input circuits 31 and 32 for U phase line and W phase line for inputting voltages of U phase line and W phase line of the external electric power system 1 as detected signals; and a controller (MPU) 12 for controlling the inverter circuit 13 so as to restrict the output electric power when it detects the reverse power flow based on the signals from the CT input circuits (AD converters) 15A, 15B and 15C, and the voltage input circuits 31 and 32.

A reference numeral 33 designates an exhaust heat recovery device.

Figure 2:
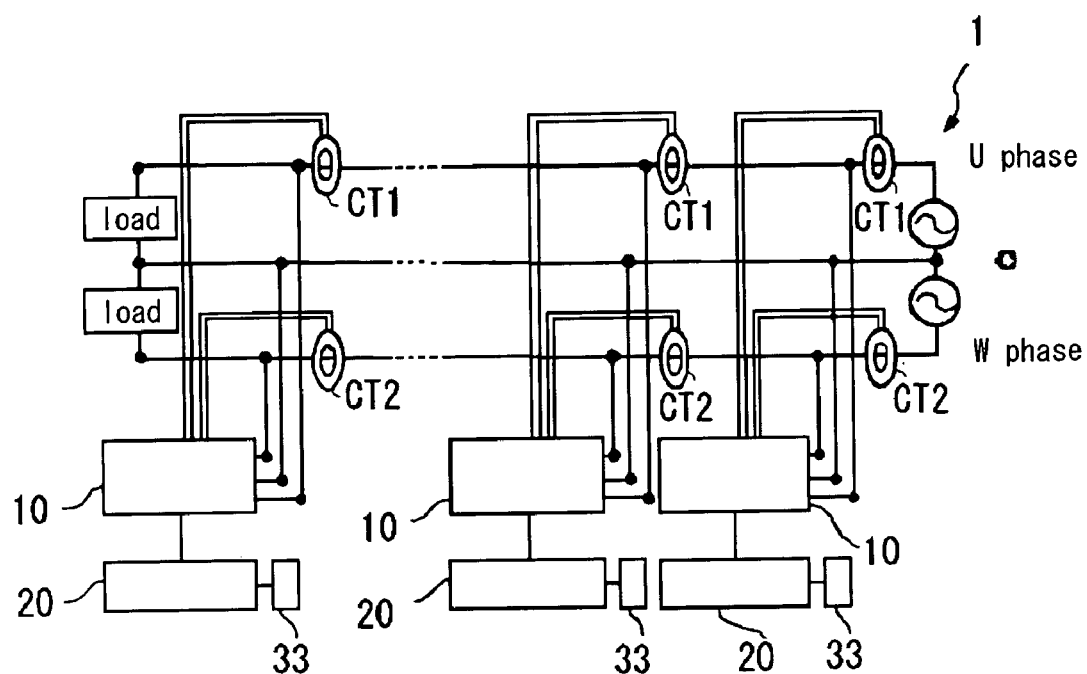
FIG. 2 is a diagram of an interconnection system of which multiple cogeneration systems are connected to an external electric power system.

Then, it may be considered for increasing the generation capacity that, as shown in FIG. 2, a plurality of the above-mentioned power conditioners 10 are not mutually interconnected but independently interconnected to the external electric power system 1.

In such a connection system having the power conditioners 10 which are not interconnected mutually, all the power conditioners 10 are required to detect the reverse power flow.

Therefore, the power conditioner 10 disposed near the power source of the external electric power system 1 tends to detect a large value of reverse power flow.

Accordingly, the power conditioner 10 disposed near the power source of the external electric power system 1 frequently decreases its output power and stops based on the detection of reverse power flow.

Consequently, output powers of the power conditioners 10 are unequal.

Figure 3:
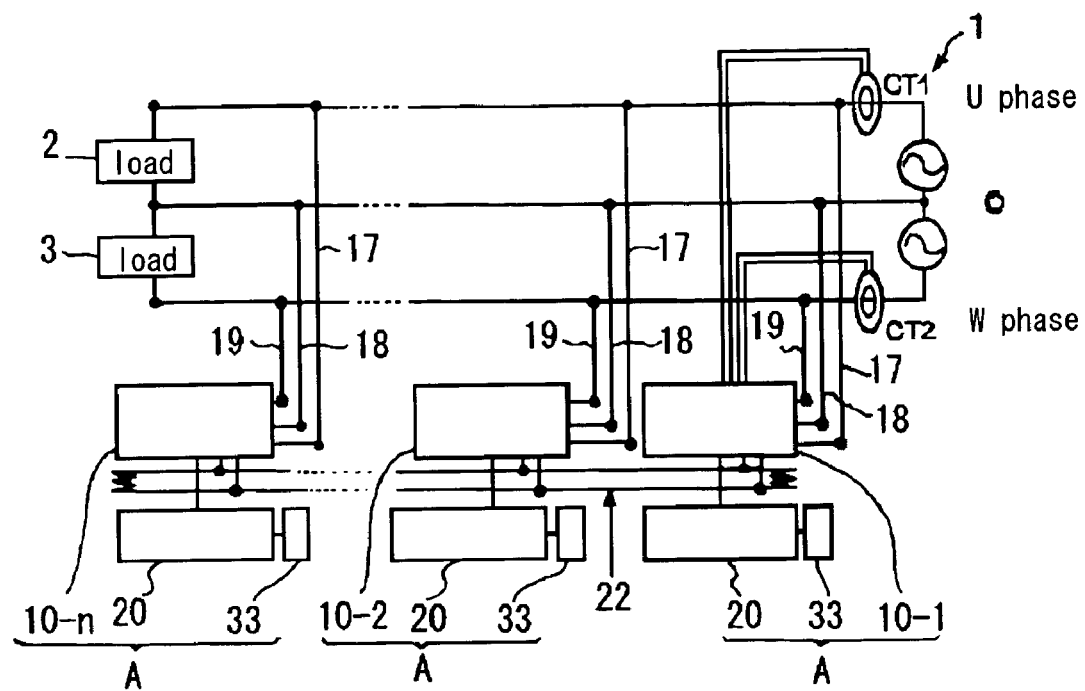
FIG. 3 is a diagram of an interconnection system having an operation controller of power conditioners concerning an embodiment 1-1 of the invention.
Figure 10:
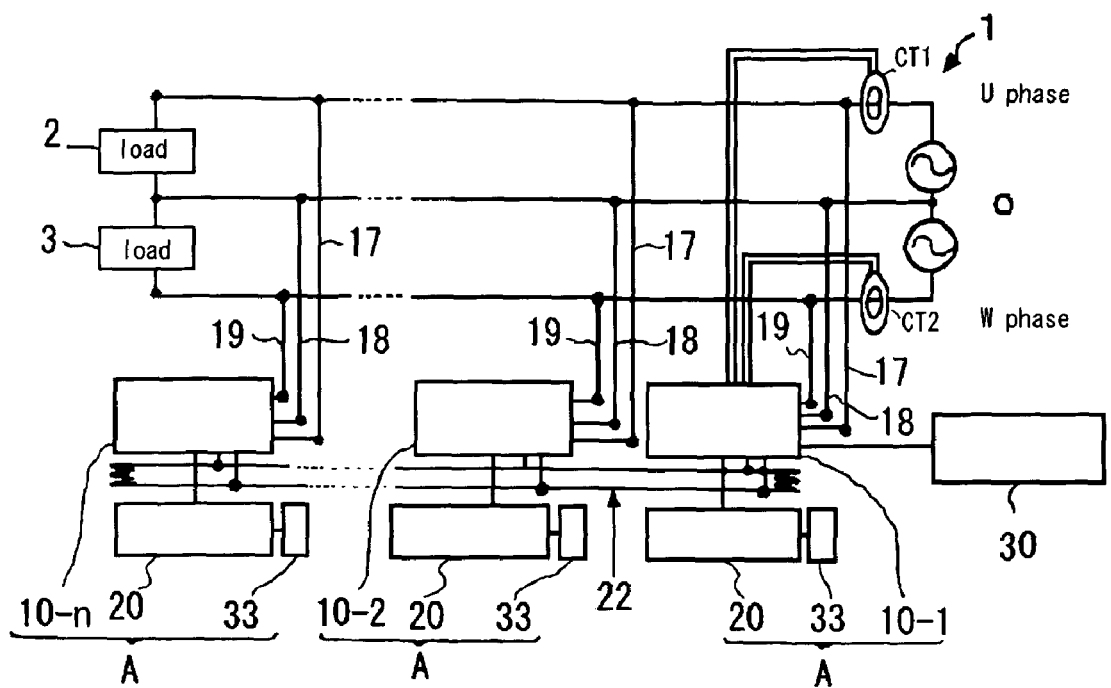
FIG. 10 is a diagram of an interconnection system having an operation controller of power conditioners concerning an embodiment 1-2 of the invention.

An interconnection system shown in FIG. 3 and an interconnection system shown in FIG. 10 are provided for canceling the inequality among the power conditioners 10.

Embodiment 1-1

An embodiment 1-1 according to the invention is shown in FIGS. 3 to 9.

FIG. 3 illustrates an interconnection system which links multiple cogeneration systems A with the external electric power system 1. In FIG. 3, the external electric power system 1 has three lines for single-phase power. A first (one) load 2 is connected between U phase line and neutral line O of the external electric power system 1. A second (another) load 3 is connected between W phase line and neutral line O of the external electric power system 1.

Each of the cogeneration systems A has the power conditioner 10, the electric power generation system 20 for supplying electric power to the power conditioner 10, and the exhaust heat recovery device 33. In the power conditioners ranked in order away from the external electric power system 1, the first power conditioner is referred to as "10-1", the second as "10-2", and the power conditioner of an ordinal rank n is referred to as "10-n".

The power conditioner 10-1 closest to the power source of the external electric power system 1 serves as a monitoring power conditioner for monitoring the reverse power flow. The other power conditioners 10-2 to 10-n are non-monitoring power conditioners which do not monitor the reverse power flow.

Figure 4:
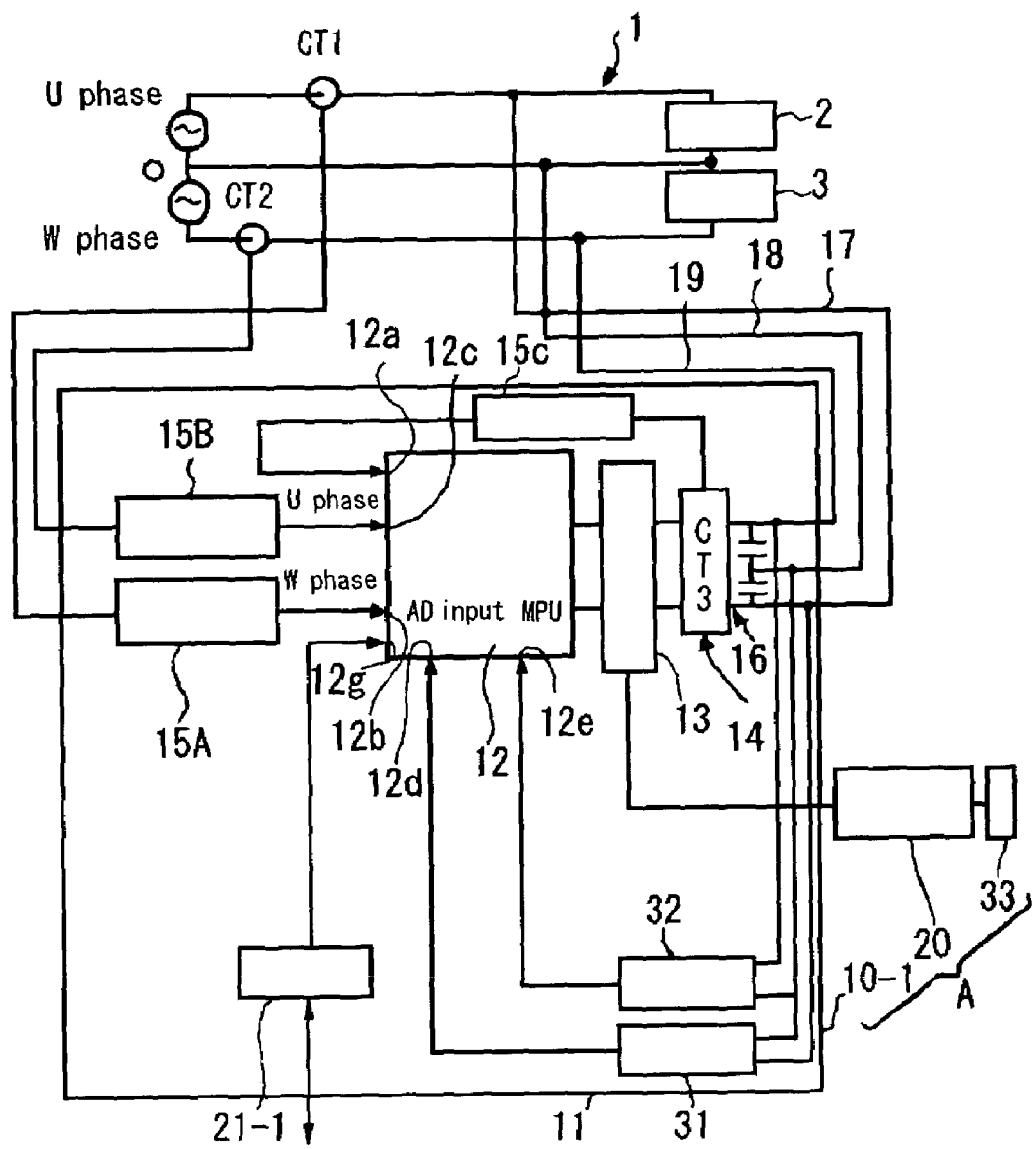
FIG. 4 is a diagram of the power conditioner.

As shown in FIG. 4, the monitoring power conditioner 10-1 comprises an inverter circuit 13 serving as an electric power conversion means for converting electric power from the electric power generation system 20 into alternating-current power synchronized with the power from the external electric power source; respective CT input circuits (AD converters) 15A and 15B for U phase line and W phase line for inputting detected signals from respective current detectors CT1 and CT2 for detecting the direction and amount of respective current flowing in U phase line and W phase line of the external electric power system 1; an output current measuring device (a current transformer) CT3 for detecting the amount of output current from the inverter circuit 13; a CT input circuit (an AD converter) 15C for inputting detected signal from the output current measuring device CT3; respective voltage input circuits 31 and 32 for U phase line and W phase line for inputting voltages of U phase line and W phase line of the external electric power system 1 as detected signals; a transmitter-receiver 21-1 serving as means for transmitting information about the amount of its own output electric power, its own status, and the monitor electric power of reverse power flow, and for receiving information of the non-monitoring power conditioners 10-2 to 10-n, that is, their output electric powers and their statuses; and a controller (MPU) 12 for controlling the inverter circuit 13 so as to restrict the output electric power when it detects the reverse power flow based on the signals from the CT input circuits (AD converters) 15A, 15B and 15C, and the voltage input circuits 31 and 32.

Figure 5:
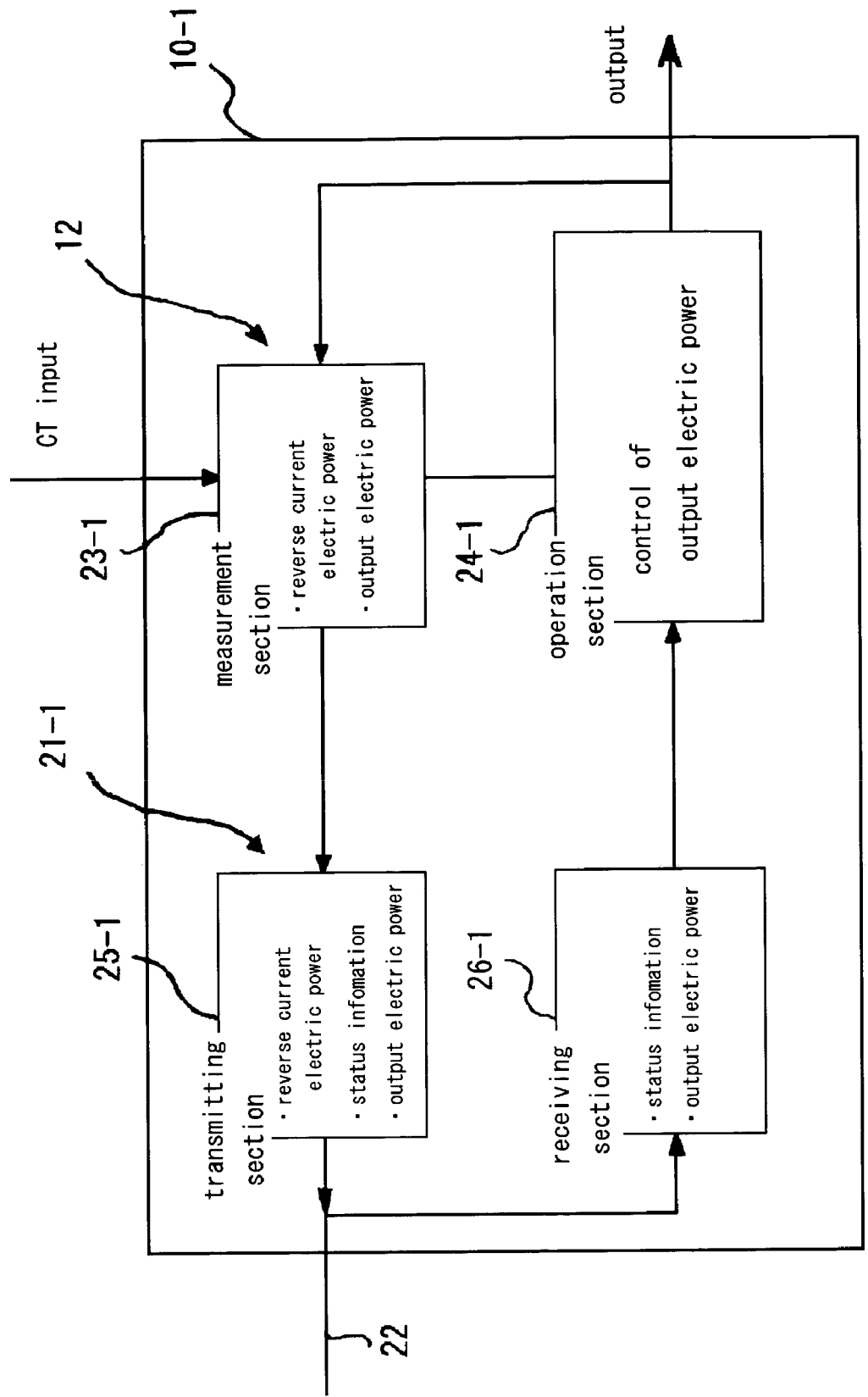
FIG. 5 is a diagram of general construction of the power conditioner.

As shown in FIG. 5, the controller 12 has a measurement section 23-1 and an operation section 24-1. The transmitter-receiver 21-1 has a transmitting section 25-1 and a receiving section 26-1.

As input sections of the controller 12 are provided an output-signal input section 12a for inputting the signal of its output electric power, signal input sections 12b and 12c for inputting respective signals, voltage-signal input sections 12d and 12e for inputting respective voltage signals, and a signal input/output section 12g which also serves as an output section.

The controller 12 has an output section connected to a controller (not shown) in the inverter circuit 13. The input section of the inverter circuit 13 is connected to the output section of the electric power generation system 20. The output section of the inverter circuit 13 is connected to a signal output device 16.

The signal output device 16 has a U-phase connection line 17 connected to U phase line of the external electric power system 1, a neutral connection line 18 connected to the neutral line O of the external electric power system 1, and a W-phase connection line 19 connected to W phase line of the external electric power system 1.

The input section of the voltage input circuit 31 is connected to the signal output device 16 so as to detect the voltage of U phase power from the signal output device 16 through the U-phase connection line 17 and the neutral connection line 18. The input section of the voltage input circuit 32 is connected to the signal output device 16 so as to detect the voltage of W phase from the signal output device 16 through the W-phase connection line 19 and the neutral connection line 18.

The signal output device 16 is provided with the output current measuring device CT3 serving as an output electric power detector 14.

The signal output section of the output current measuring instrument CT3 is connected to the input side of the CT input circuit (the AD converter) 15C.

The output section of the CT input circuit (the AD converter) 15C is connected to the input section 12a of the controller 12.

The output section of the CT input circuit (AD converter) 15A is connected to the input section 12b. The output section of the CT input circuit (AD converter) 15B is connected to the input section 12c.

The output section of voltage input circuit 31 is connected to the input section 12d. The output section of voltage input circuit 32 is connected to the input section 12e.

The transmitter-receiver 21-1 is connected to the input/output section 12g of the controller 12. The input section of the CT input circuit 15A, whose output section is connected to the input section 12b of the controller 12, is connected to the signal output section of the current detector (current transformer) CT1 disposed on U phase line of the external electric power system 1 from the external electric power source. The input section of the CT input circuit 15B, whose output section is connected to the input section 12c of the controller 12, is connected to the signal output section of the current detector (current transformer) CT2 disposed in W phase line of the external electric power system 1 from the external electric power source.

For example, the electric power generation system 20 comprises a gas engine and a generator driven by the gas engine.

Figure 7:
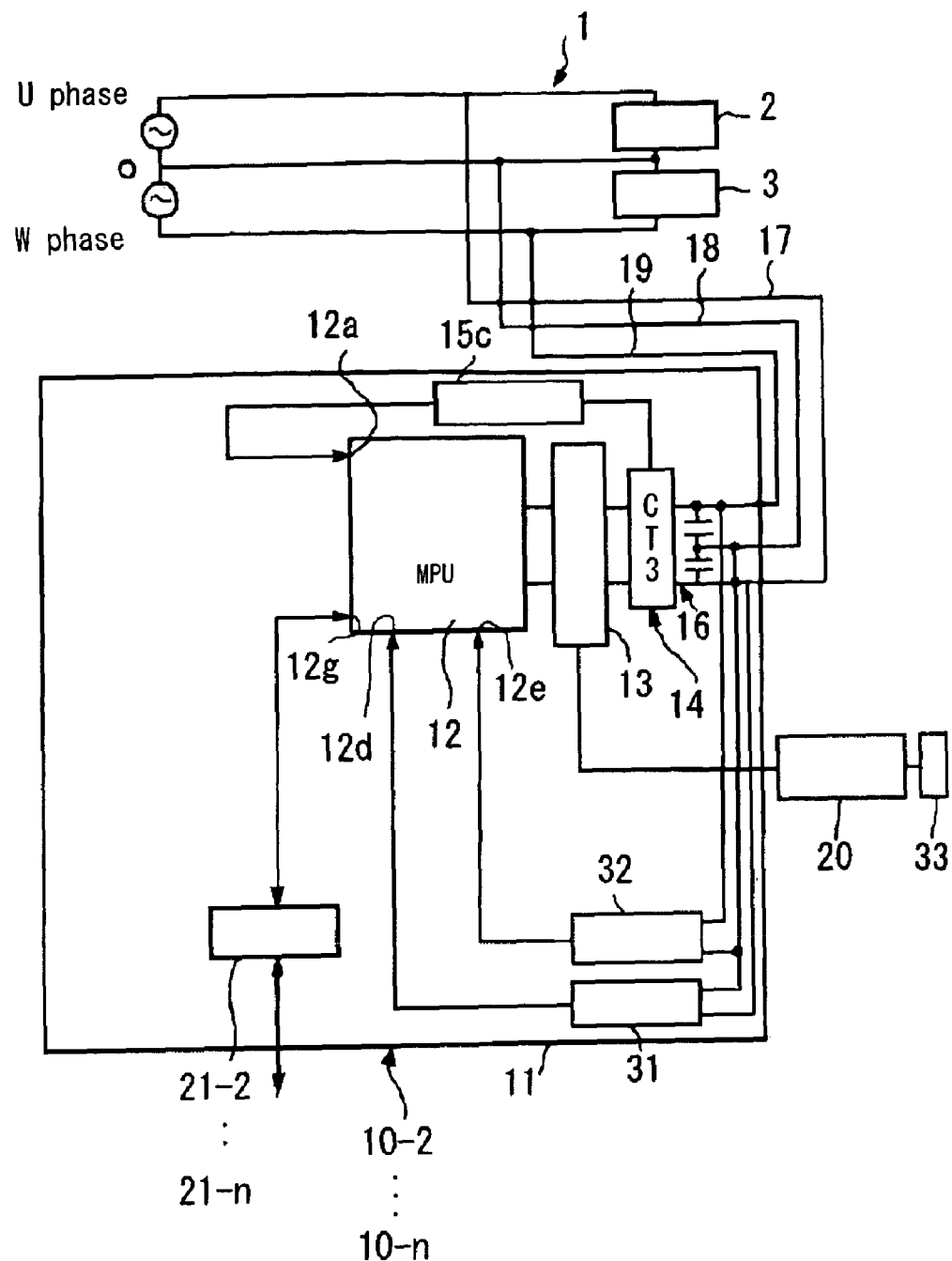
FIG. 7 is a diagram of another power conditioner.

As shown in FIG. 7, each of the non-monitoring power conditioners 102 to 10-n comprises an inverter circuit 13 serving as an electric power conversion means for converting electric power generated by the electric power generation system 20 into alternating-current power synchronized with the power from the external electric power source; an output current measuring device (a current transformer) CT3 for detecting the amount of output current from the inverter circuits 13; an CT input circuit (an AD converter) 15C for inputting the detected signal from the output current measuring instruments CT3, voltage input circuits 31 and 32 serving as respective voltage input means for U phase line and W phase line for inputting voltages of U phase line and W phase line of the external electric power system 1 as detected signals; transmitter-receivers 21-2 to 21-n as means for receiving respective informations of output electric powers of the monitoring power conditioner 10-1 and the other of the non-monitoring power conditioners 10-2 to 10-n, and for transmitting information of its own status and output electric power; and a controller (MPU) 12 for receiving signals from the output current measuring device (current transformer) CT3 and voltage input circuits 31 and 32 and information about output electric powers of the monitoring power conditioner 10-1 and the other non-monitoring power conditioners 10-2 to 10-n, and for controlling the electric power conversion means based on the received signals and informations so as to restrict its own output electric power.

Figure 8:
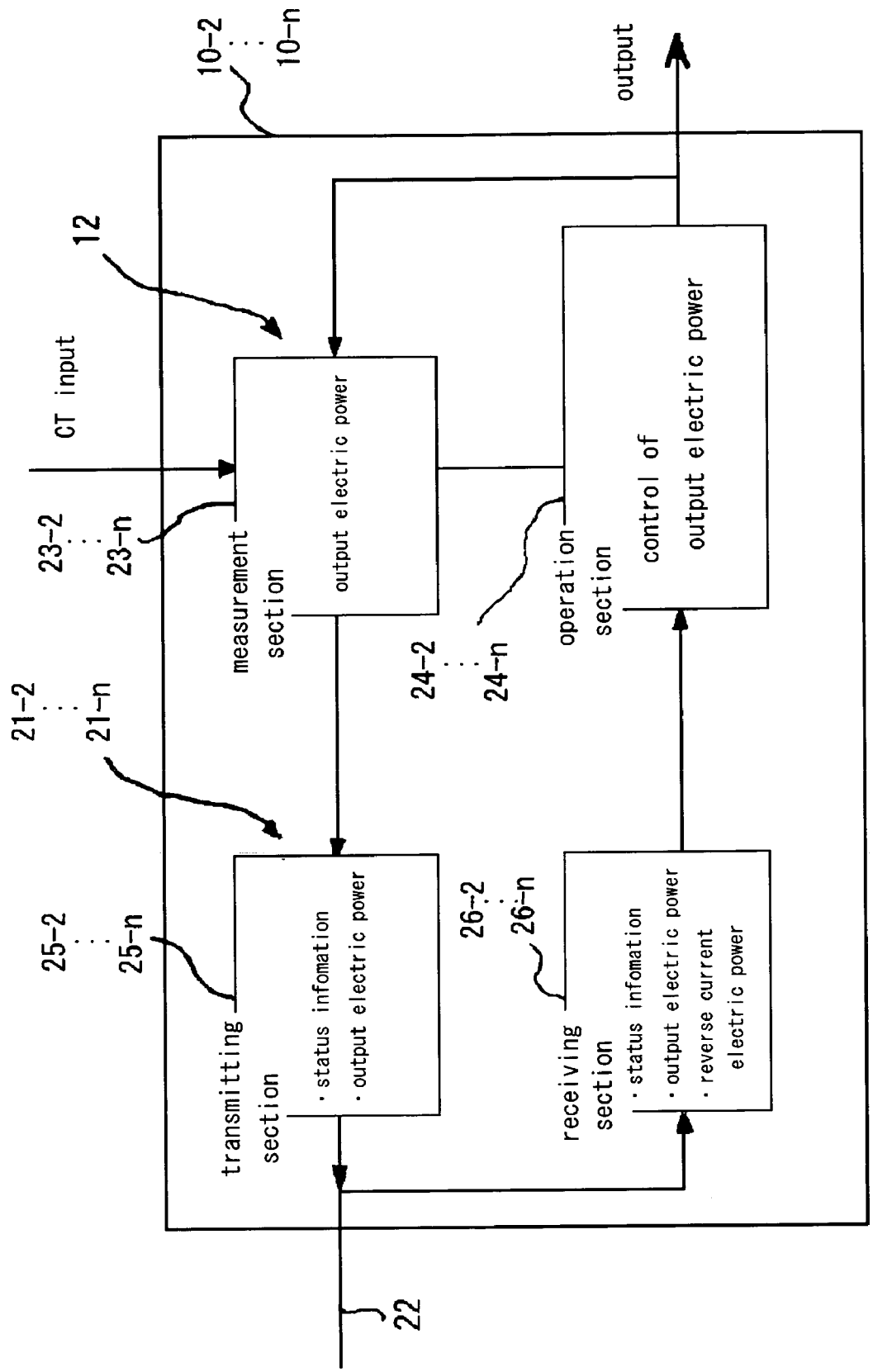
FIG. 8 is a diagram illustrating general construction of the power conditioner.

As shown in FIG. 8, their controllers 12 have respective measurement sections 23-2 to 23-n and respective operation sections 24-2 to 24-n. The transmitter-receivers 21-2 to 21-n have respective transmitting sections 25-2 to 25-n and respective receiving sections 26-2 to 26-n.

As input sections of each controller 12 are provided an output-signal input section 12*a* for inputting the signal of its own output electric power, voltage-signal input sections 12*d* and 12*e* for inputting voltage signals, and a signal input/output section 12*g* which also serves as an output section. The output section of the controller 12 is connected to a controller (not-shown) in the inverter circuit 13. The input section of the inverter circuit 13 is connected to the output section of the electric power generation system 20. The output section of the inverter circuit 13 is connected to a signal output device 16.

The signal output device 16 has a U-phase connection line 17 connected to U phase line of the external electric power system 1, a neutral connection line 18 connected to the neutral line O of the external electric power system 1, and a W-phase connection line 19 connected to W phase line of the external electric power system 1.

The input section of the voltage input circuit 31 is connected to the signal output device 16 so as to detect the voltage of U phase power from the signal output part 16 through the U-phase connection line 17 and the neutral connection line 18. The input section of the voltage input circuit 32 is connected to the signal output device 16 so as to detect the voltage of W phase line from the signal output part 16 through the W-phase connection line 19 and the neutral connection line 18.

The signal output device 16 includes the output current measuring device CT3 serving as an output electric power detector 14.

The signal output section of the output current measuring device CT3 is connected to the input section of the CT input circuit (the AD converter) 15C.

The output section of the CT input circuit (the AD converter) 15C is connected to the input section 12*a* of the controller 12. The output section of the voltage input circuit 31 is connected to the input section 12*d*. The output section of the voltage input circuit 32 is connected to the input section 12*e*.

The signal input/output section 12*g* of the controller 12 is connected to each of the transmitter-receivers 21-2 to 21-n.

The electric power generation system 20 comprises, for example, a gas engine and a generator driven by the gas engine.

The power conditioner 10-1 is connected to the other power conditioners 10-2 to 10-n through cable or radio parallel communication lines 22 as communication mediums by using the transmitter-receivers 21-1 to 21-n.

Next, description will be given on the control processes for operation of the power conditioners in the above-mentioned interconnection system with reference to flow charts shown in FIGS. 6 and 9.

The direction (normal or reverse) and amount of current in the external electric power system 1 are detected by the current detector CT1 on U phase line, and are detected by the current detector CT2 on W phase line.

In the power conditioner 10-1, the amount of output current from the output section of the inverter circuit 13 is detected by the output current measuring device CT3. The voltage of U phase power in the external electric power system 1 is inputted into the voltage input circuit 31. The voltage of W phase power in the external electric power system 1 is inputted into the voltage input circuit 32.

The value (detected signal) of normal U phase current detected by the current detector CT1 is inputted into the signal input section 12*b* of the controller 12 through the CT input circuit 15A. The value (detected signal) of normal W phase current detected by the current detector CT2 is inputted into the signal input section 12*c* of the controller 12 through the CT input circuit 15B. The value (detected signal) of generated output current detected by the current detector CT3 is inputted into the signal input section 12*a* of the controller 12 through the CT input circuit 15C. The voltages (detected signals) of U phase and W phase powers in the external electric power system 1 are inputted into the signal input sections 12*d* and 12*e* of the controller 12, respectively.

The controller 12 compares the power of normal U phase current with that of normal W phase current. The smaller of the two is referred to as CT electric power.

On the assumption that the power of normal U phase current is the CT electric power, the controller 12 compares the detected power of normal U phase current with a predetermined level $\alpha$ (not less than zero). If the power value of normal U phase current is larger than the predetermined level $\alpha$, the controller decides the normal power flow. If the power value of normal U phase current is smaller than the predetermined level $\alpha$, the controller 12 decides the reverse power flow.

The above-mentioned action is preformed by the power conditioner 10-1. The power conditioner 10-1 transmits the information measured (detected) by itself, that is, output information about its own output electric power and the electric power of reverse power flow to the receiving sections 26-2 to 26-n of the transmitter-receivers 21-2 to 21-n in the respective power conditioners 10-2 to 10-n through the parallel-system-arranging communication lines 22.

Figure 6:
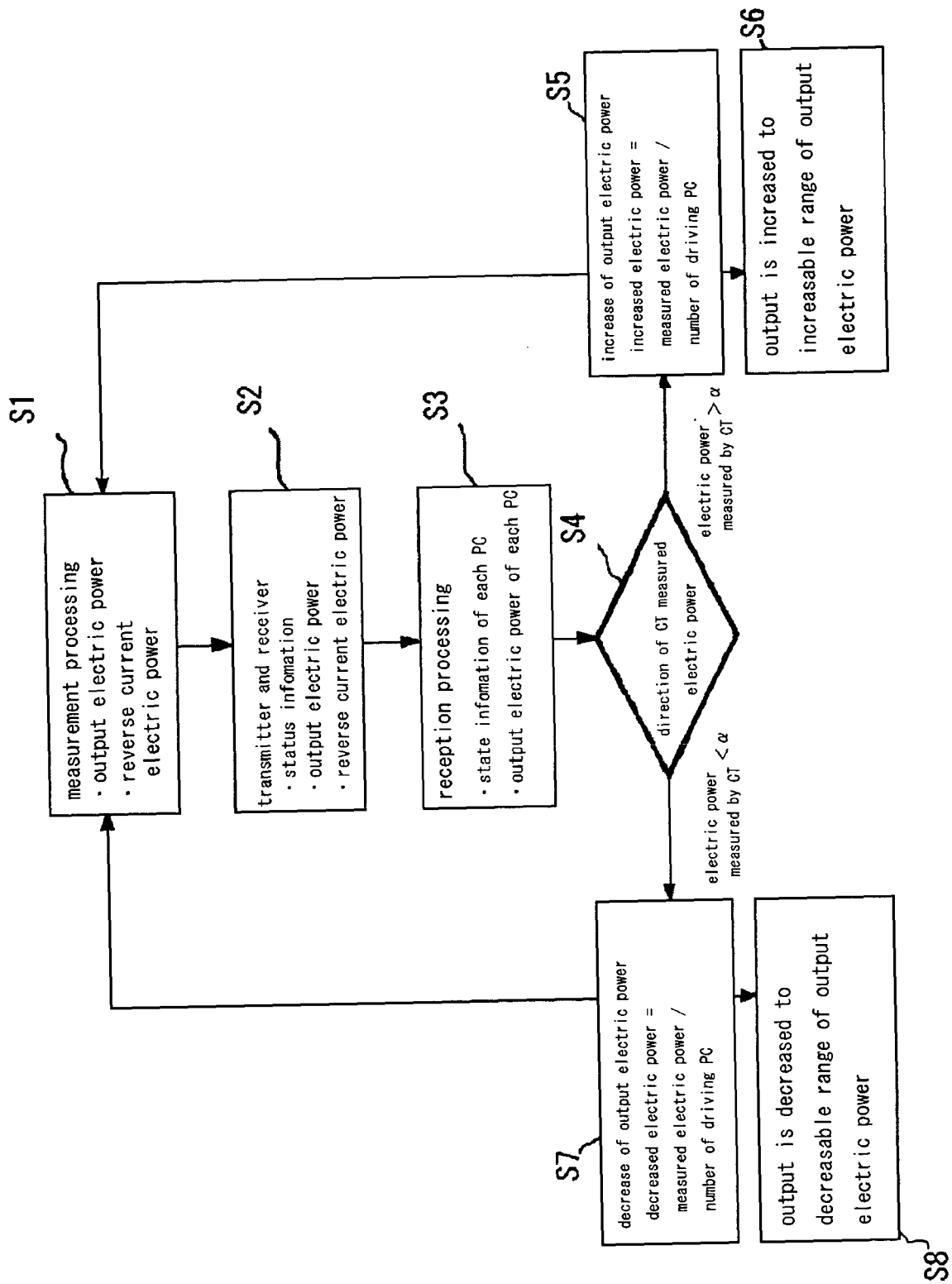
FIG. 6 is an operation flow chart of the power conditioners.

Referring to the flow chart of FIG. 6, at the measurement section 23-1 of the controller 12 in the power conditioner (PC) 10-1, measurement processing of the value of output electric power of the power conditioner (PC) 10-1 itself and the value of reverse power flow is performed (step S1). The measured value of output electric power of the power conditioner (PC) 10-1, the computed operation values of the respective power conditioners (PC), and the status information of the power conditioner (PC) 10-1 are transmitted from the transmitting section 25-1 of the transmitter-receiver 21-1 to the receiving sections 26-2 to 26-n of the transmitter-receivers 21-2 to 21-n in the respective power conditioners (PC) 10-2 to 10-n through the parallel-system-arranging communication lines 22 (step S2).

Informations of the respective power conditioners 10-2 to 10-n about their output electric power and their statuses such as operational conditions thereof are inputted to the receiving section 26-1 of the transmitter-receiver 21-1 in the power conditioner (PC) 10-1 through the parallel-system-arranging communication lines 22 (step S3).

Next, at the operation section 24-1, based on the measured values of output electric power of the power conditioner (PC) 10-1 and of reverse power flow, and respective informations about statuses and output electric powers of the power conditioners (PC) 10-2 to 10-n, when the measured CT electric power is larger than the predetermined level α (α is electric power value more than zero or zero), the inverter circuit 13 is ordered so as to increase its output electric power to an output increasable range (step S4, step S5 and step S6).

When the CT measured electric power is smaller than the predetermined level α (α is electric power value more than zero or zero), the inverter circuit 13 is ordered so as to decrease its output electric power to an output decreasable range (step S4, step S7 and step S8).

Figure 9:
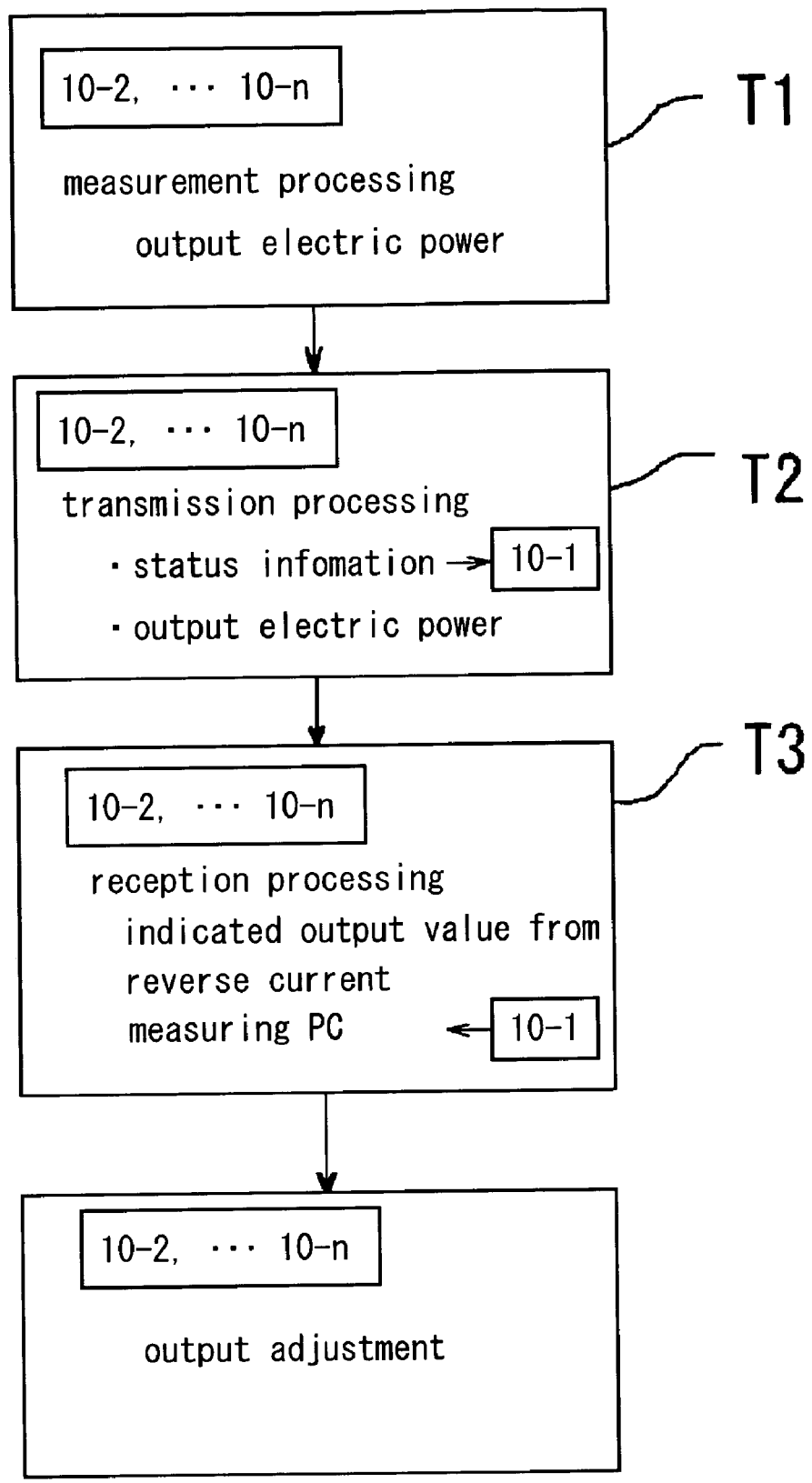
FIG. 9 is an operation flow chart of the power conditioner.

In each of the power conditioners (PC) 10-2 to 10-n, as shown in the flow chart of FIG. 9, measurement processing of the value of output electric power of the power conditioner itself is performed at each of the measurement sections 23-2 to 23-n of the controller 12 (step T1). The measured output electric powers and status informations (such as driving status or synchronized signal of independent operation) of the respective power conditioners (PC) 10-2 to 10-n are transmitted from the transmitting sections 25-2 to 25-n of the transmitter-receivers 21-2 to 21-n to the receiving section 26-1 of the transmitter-receiver 21-1 of the power conditioner (PC) 10-1 through the parallel-system-arranging communication lines 22 (step T2).

Based on the status informations and actual output informations from the power conditioners (PC) 10-2 to 10-n, the power conditioner (PC) 10-1 calculates electric power which each of the power conditioners (PC) should output. The calculated values are transmitted as command signals to the respective receiving sections 26-2 to 26-n of the transmitter-receivers 21-2 to 21-n of the power conditioners (PC) 10-2 to 10-n through the parallel-system-arranging communication lines 22 (step T3). The power conditioners 10-2 to 10-n carry out reception processing of the values, and regulate their output electric powers.

As mentioned above, the embodiment 1-1 according to the present invention, the parallel-system-arranging communication lines 22 of cable or radio system are used for interconnecting the power conditioners 10-1 to 10-n so as to exchange the respective informations about the power conditioners 10-1 to 10-n, that is, the values of output electric powers, the synchronizing signals for independent operations, driving statuses, and the like.

The single power conditioner 10-1 monitors electric power of reverse power flow, and calculates output values for the respective power conditioners based on this monitor information and respective output informations of the power conditioners, and transmits the output values to the respective power conditioners.

Based on these transmitted values, output powers of the power conditioners 10-2 to 10-n are controlled respectively.

Further, the parallel-system-arranging communication lines 22 are used for transmitting these informations to the power conditioners 10-1 to 10-n so as to equalize all the controlled generation powers in correspondence to the reverse power flow.

In this way, outputs of the power conditioners 10-1 to 10-n are equalized so as to equalize the availability and life of the system.

The interconnection of the power conditioners 10-1 to 10-n facilitates for building a mass generation system. The system can be built on the basis of the single power conditioner 10-1, and the capacity of the system can be changed easily by adding other power conditioners.

Accordingly, the single power conditioner 10-1 serves as a main system controller for controlling other power conditioners.

If connectors are used as their interconnecting sections, the system can be modified more easily.

By using the parallel-system-arranging communication lines 22, no additional current detector CT is needed for addition of a power conditioner, thereby reducing costs.

If the communication lines 22 of radio system is uses, the system may be modified more easily.

The monitoring power conditioner 10-1 for monitoring reverse power flow has the respective CT input circuits 15A and 15B for U phase and W phase for inputting the detected signal from the respective current detectors CT1 and CT2 for detecting the direction and amount of currents flowing in U phase line and W phase line of the external electric power system 1. On the other hand, the CT input circuits 15A and 15B are not required for the non-monitoring power conditioners 10-2 to 10-n which do not monitor the reverse power flow.

Since only the monitoring power conditioner 10-1 requires the current detectors (CT) as electric power detectors for detecting the reverse power flow, and the other power conditioners 10-2 to 10-n don't require the current detectors (CT), the number of the current detectors (CT) can be reduced.

By the operation control method of power conditioners according to the invention, the power conditioners 10-1 to 10-n linked with the external electric power system 1 exchange informations so as to prevent the reverse power flow.

All the power conditioners 10-1 to 10-n are controlled to equalize their output powers by monitoring the reverse power flow by one of the multiple power conditioners 10-1 to 10-n, that is, the power conditioner 10-1.

Accordingly, the power conditioners 10-1 to 10-n is provided with respective informations for controlling the respective output powers, thereby preventing the reverse power flow.

The informations are transmitted to all the power conditioners 10-1 to 10-n so as to equalize their controls of output power corresponding to the reverse power flow.

Accordingly, output powers of the power conditioners 10-1 to 10-n are equalized so as to equalize the availability and life of the system.

Embodiment 1-2

An embodiment 1-2 of the invention is shown in FIG. 10.

The embodiment 1-2 of the invention is constructed by connecting a personal computer (PC) 30 serving as an external input/output means to the controller 12 of the power conditioner 10-1 of the above-mentioned embodiment 1-1 of the invention.

The other parts of this embodiment having the same construction as those of the embodiment 1-1 of the invention designated by the same reference numerals will not be described.

By connecting the personal computer 30 to the controller 12 of the power conditioner 10-1, informations of all power conditioners 10-1 to 10-n exchanged through the parallel-system-arranging communication lines 22 can be acquired.

Any power condition may be used for setting respective set points of all the power conditioners 10-1 to 10-n due to transmission of command signals through the parallel-system-arranging communication lines 22.

Embodiment 2

Embodiment 2-1

Next, description will be given on another embodiment of a power generation system of the invention according to FIGS. 11 to 13.

In this embodiment, multiple power conditioners are connected to a single power generation system. Referring to FIGS. 11 to 13, the power generation system comprises a prime mover 42, multiple armature windings 60 and so on.

Construction of a Co-Generation System

Description will be given on a co-generation system A according to the invention shown in FIG. 11. The external electric power system shown in FIG. 11 of single-phase three-line type actually has U phase, V phase, W phase and O phase (neutral) lines). However, in the drawing, only U phase, W phase and O phase (neutral) lines are shown for convenience of description.

The co-generation system A mainly comprises the prime mover 42, a generator 43, an exhaust heat recovery device 33, a controller 12 and inverter circuits 13a and 13b.

A radiator fan 47 is provided in the vicinity of the prime mover 42. The heat recovery device 33 exchanges heat between cooling water 8 circulating in the prime mover 42 and recovery warm water 9 from a heat consumption device (not shown).

A starter 50 is provided in the prime mover 42. Electric power is supplied to the starter 50 from later-discussed electric-power transmission lines U3 and W3 (including respective generated electric power transmission lines 17 and 19) through a transformer 11.

In the generator 43, a rotor (not shown) having field windings to be excited with a direct-current power source is provided on a rotary shaft 52 connected to the driving shaft of the prime mover 42, and a stator (not shown) has armature windings 60a and 60b for outputting respective three-phase output powers 70a and 70b. Accordingly, the generator 43 of a revolving field type is constructed so that the armature windings 60a and 60b are provided on the stator. Alternatively, the generator 43 may be constructed as an armature field type having armature windings 60a and 60b on its rotor.

The three-phase output powers 70a and 70b from the generator 43 are rectified and smoothed by respective diodes 61a and 61b and capacitors 62a and 62b, and connected to direct-current input sections of the respective inverter circuits 13a and 13b. The generated electric power lines 17 and 19 are extended from the respective inverter circuits 13a and 13b.

The prime mover 42, the generator 43, the exhaust heat recovery device 33 and the inverter circuits 13a and 13b, which are main components of the co-generation system A, are controlled by the controller 12. Furthermore, the co-generation system A is controlled by use of an operation indicator 28 and a remote operation indicator 29 which indicate and change the action state of the controller 12.

Construction of Interconnection

Figure 11:
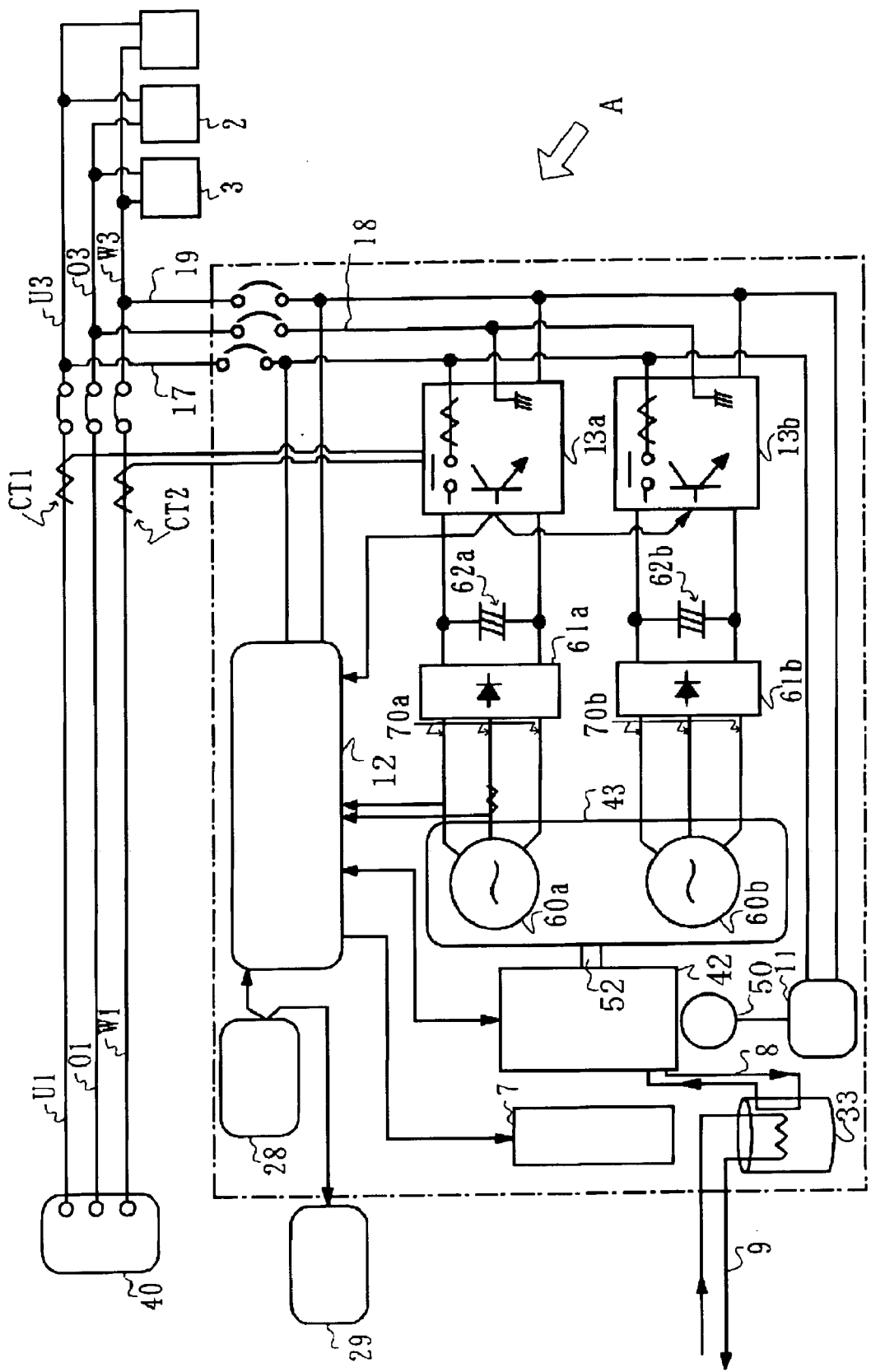
FIG. 11 is a circuit diagram of a cogeneration system having a generator comprising two armature windings r.

FIG. 11 shows interconnection of the system with the single-phase three-lines type external electric power system.

The external electric power system has three lines, that is, a U-phase power line U1, a W-phase power line W1, and a neutral line O1 extended from an external electric power source 40, so as to provide electric power of a voltage of 200 V. The generated electric power systems 17 and 19 from the co-generation system A are connected in parallel to the external U-phase and W-phase electric power lines U1 and W1, respectively. The external electric power system of lines U1, W1 and O1 and the generated electric power system of lines 17 and 19 transmits to electric power consumption devices (loads) 24 through the electric power transmission lines U3, W3 and O3.

Current transformers CT1 and CT2 for detecting current of load are provided on the respective external electric power lines U1 and W1.

The single inverter circuit 13a of the multiple inverter circuits 13a and 13b calculates electric power values in the respective external electric power lines U1 and W1 from the current transformers CT1 and CT2. The inverter circuit 13a sums up a total output power which the inverter circuit 13a and 13b output to the consumption devices 24, and divides it by the number of inverters (in the example of FIG. 11, the number is two, and in the example of FIG. 12, the number is n) so as to calculate a set output power value for each inverter, thereby making electric power values of the external electric power lines U1 and W1 constant.

The multiple inverter circuits 13a and 13b communicate mutually by multidrop network. The inverter circuit 13a, which calculates electric power values of the external electric power lines U1 and W1, transmits the set output power value to the other inverter circuit 13b. The inverter circuit 13b controls its output power so as to adjust it to the set output power value transmitted from the inverter circuit 13a.

The processes of the co-generation system A by the above-mentioned interconnection will now be detailed.

(1) In the case that power consumption increases:

According to increase of consumed electric power in the electric power transmission lines U3 and W3, the amount of electric power flowing in the external electric power lines U1 and W1 increases.

The inverter circuit 13 calculates the increased electric power values in the respective external electric power lines U1 and W1 by the current transformers CT1 and CT2.

The inverter circuit 13 controls the inverter circuit 13a and 13b so as to increase their output powers.

(2) In the case that power consumption decreases:

According to decrease of consumed electric power in the electric transmission lines U3 and W3, the amount of electric power flowing in the external electric power lines U1 and W1 decreases.

The inverter circuit 13 calculates the decreased electric power values of the external electric power systems U1 and W1 by the current transformers CT1 and CT2.

The inverter circuit 13 controls the inverter circuit 13a and 13b so as to decrease their output powers.

Construction of Multiple Armature Windings in the Generator

As shown in FIG. 11, the generator 43 is provided with two armature windings 60a and 60b on a rotator.

The construction is not limited to this embodiment. Alternatively, the two armature windings 60a and 60b may be provided on a stator or respective stators.

Figure 12:
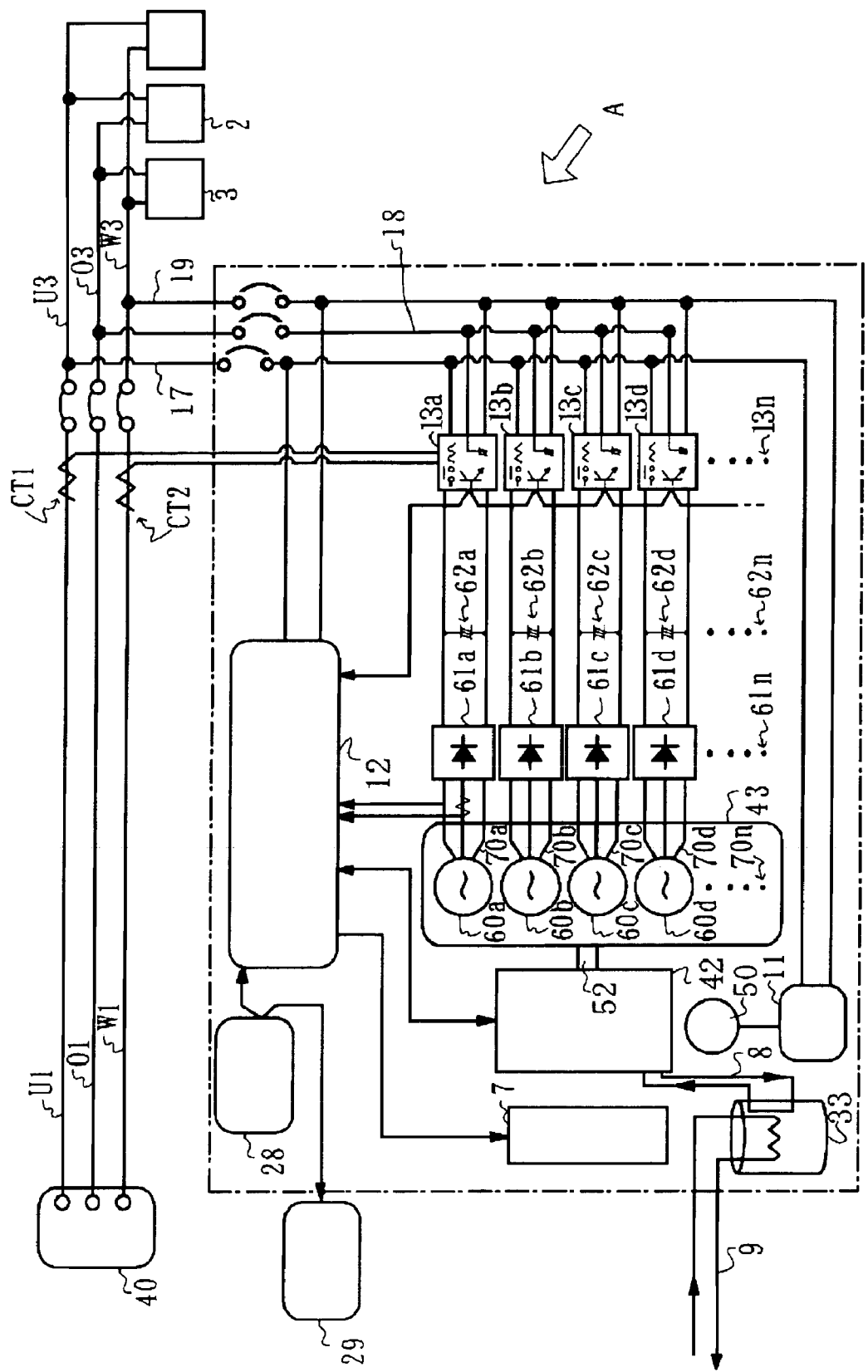
FIG. 12 is a circuit diagram of a cogeneration system having a generator comprising multiple (n pieces) armature windings.

In FIGS. 11 and 12, signs which usually represent generators are used for designate armature windings 60a and 60b, thereby clarifying that the armature windings 60a and 60b are power generation sections.

According to the above-mentioned construction, as shown in FIG. 11, the three-phase output powers 70a and 70b are separately taken out from the respective armature windings 60a and 60b. The three-phase output powers 70a and 70b from the generator 43 are rectified and smoothed by respective diodes 61a and 61b and capacitors 62a and 62b, and connected to direct-current input sections of the respective inverter circuits 13a and 13b. The output powers of the inverter circuits 13a and 13b are integrated through the generated electric power lines 17 and 19 unified as one generated electric power transmission system of the co-generation system A.

FIG. 12 illustrates a further representative construction wherein the number of multiple armature windings is represented as "n".

In this example, n pieces of armature windings 60a, 60b . . . are provided on the rotary shaft. Corresponding to the respective armature windings, three-phase output powers 70a, 70b . . . , diodes 61a, 61b . . . , capacitors 62a, 62b . . . , and inverter circuits 13a, 13b . . . are provided respectively.

Details of the composition in the generator 43 are the same as those of the above-mentioned example having two armature windings.

The Effect by Making an Armature of a Generator into Multiple Windings

With regard to the example shown in FIG. 11, the total electric power generated by the two armature windings 60a and 60b results in the output power transmitted by the generated electric power lines 17 and 19. Accordingly, the power generated by each of the armature windings 60a and 60b is half (½) of that generated by the generator 43 having one armature winding.

Corresponding to the electric power generated by each of the armature windings 60a and 60b, each of the inverter circuits 13a and 13b can do well if its capacity is half of that of only one inverter as a whole provided for only one armature winding. Accordingly, each of the inverter circuits 13a and 13b may be provided with an inverter which outputs stable power and is smaller in size, capacity and cost than that for one armature winding provided as a whole.

Furthermore, when one of the two inverter circuits, for example, the inverter circuit 13b is made into the state of parallel off, only the inverter circuit 13a outputs power. Accordingly, compared with the case that only one inverter is provided as a whole, half output power as much as the whole capacity is saved. Thus, even if power consumption of loads becomes so small, excessive output of generated electric power causing the reverse power flow is prevented.

With regard to the example shown in FIG. 12, electric power generated by each of the armature windings 60a, 60b . . . is 1/n of the power generated by only one armature winding provided to the generator 43 as a whole. An inverter having 1/n of the capacity outputted from an inverter for one armature winding as a whole is applicable for each of the inverter circuits 13a, 13b . . . , whereby the inverter circuits 13a, 13b, . . . enable to output smaller (1/n) electric power.

Design of the Co-Generation System

Selection of the number of the armature windings 60 enables designing the co-generation system A for generating variable power in a range from low to high so as to have the above-mentioned effect.

For example, the larger the number of provided armature windings 60 is, the smaller the capacity of electric power controlled by each of the inverter circuits 13 corresponding to the respective armature windings 60 becomes. Of course, it should be considered that many parts (components) brings complication and expensiveness.

The smallest and largest outputs of the generator can be changed by changing the number of the armature windings 60, that is, by selecting the number of component parts corresponding to the designed output power of the co-generation system while the kind of each component part is uniformed. Accordingly, the effect for manufacturers is to reduce costs for manufacturing and stocking the various component parts, and the effect for customers is to obtain the cogeneration system designed according to their requests.

Figure 13:
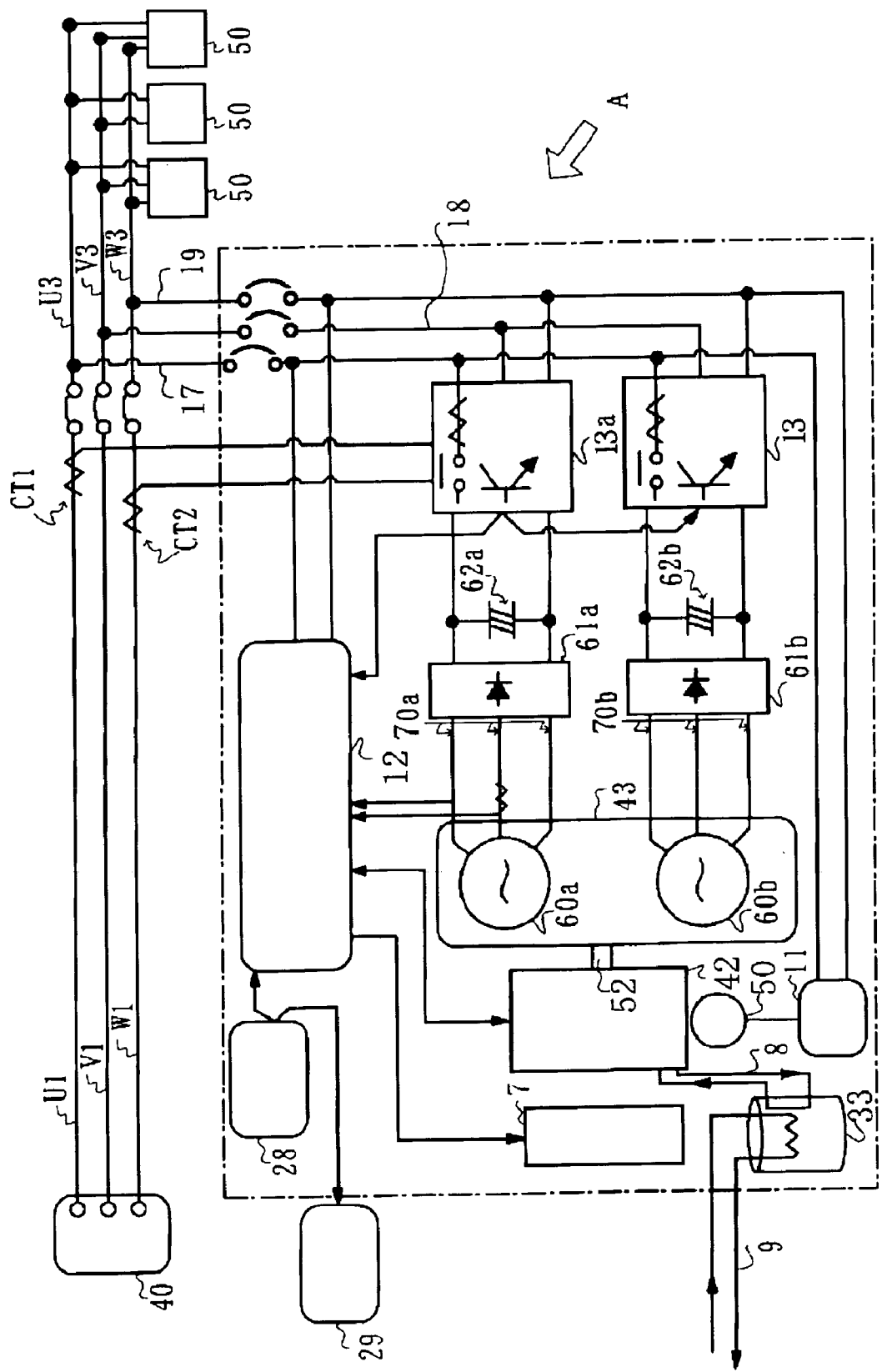
FIG. 13 is a circuit diagram of a cogeneration system of an embodiment that inverter outputs are connected to triphasic output electric power systems.

Embodiment of Connection of Inverter Output to a Three-Phase External Electric Power System FIG. 13 illustrates an embodiment of electric power supply to three-phase power loads 50 by connecting inverter output lines 17, 18 and 19 to three-phase external electric power lines U1, V1 and W1.

In this embodiment, the inverter output lines 17, 18 and 19 are provided for output power from the inverter circuits 13a and 13b, and connected to the U phase power line U1, the V phase power line V1, and the W phase power line W1 of the three-phase external electric power system, respectively.

The power consumption of the loads 50 is calculated by introducing current from the current transformers CT1 and CT2 provided on the respective three-phase external electric power lines U1, V1 and W1 in inverter circuits 13a and 13b.

In this way, the co-generation system according to the invention is applicable to not only the above-mentioned single-phase external electric power system but also a three-phase external electric power system.

Embodiment 3

Next, description will be given on a third embodiment of a power generation system in accordance with FIGS. 4 to 13.

Next, description will be given on the embodiment of the invention according to the drawings.

First, description will be given on the entire construction of generators for distributing power supplies in accordance with FIG. 14.

The power generation system comprises multiple electric power plants 102, communication lines 103 which connect the electric power plants 102 mutually, and a management system 110 connected to the electric power plants 102 by the communication lines 103. A generator system comprises each electric power plant, and the power generation system comprises multiple generator systems.

The multiple electric power plants 102 are connected mutually through the communication lines 103 of the multidrop type. More specifically, each of the multidrop communication lines 103 connects adjoining electric power plants 102 mutually through each electric power plant 102. Namely, the multidrop connection of electric power plants 102 is constructed by the communication lines 103 each of which is interposed between every adjoining electric power plants 102.

The marginal electric power plant 102 is connected to the management system 110 through the communication line 103.

The management system 110 recognizes the states of the generator systems and transmit control signals to the generator systems.

The management system 110 may be a remote control system connecting with the generator systems through a communication network such as telephone lines. The connection of the management system 110 with the generator systems may be constructed only when it is needed. The generator systems can work by themselves even if they are not connected to the management system 110.

Figure 14:
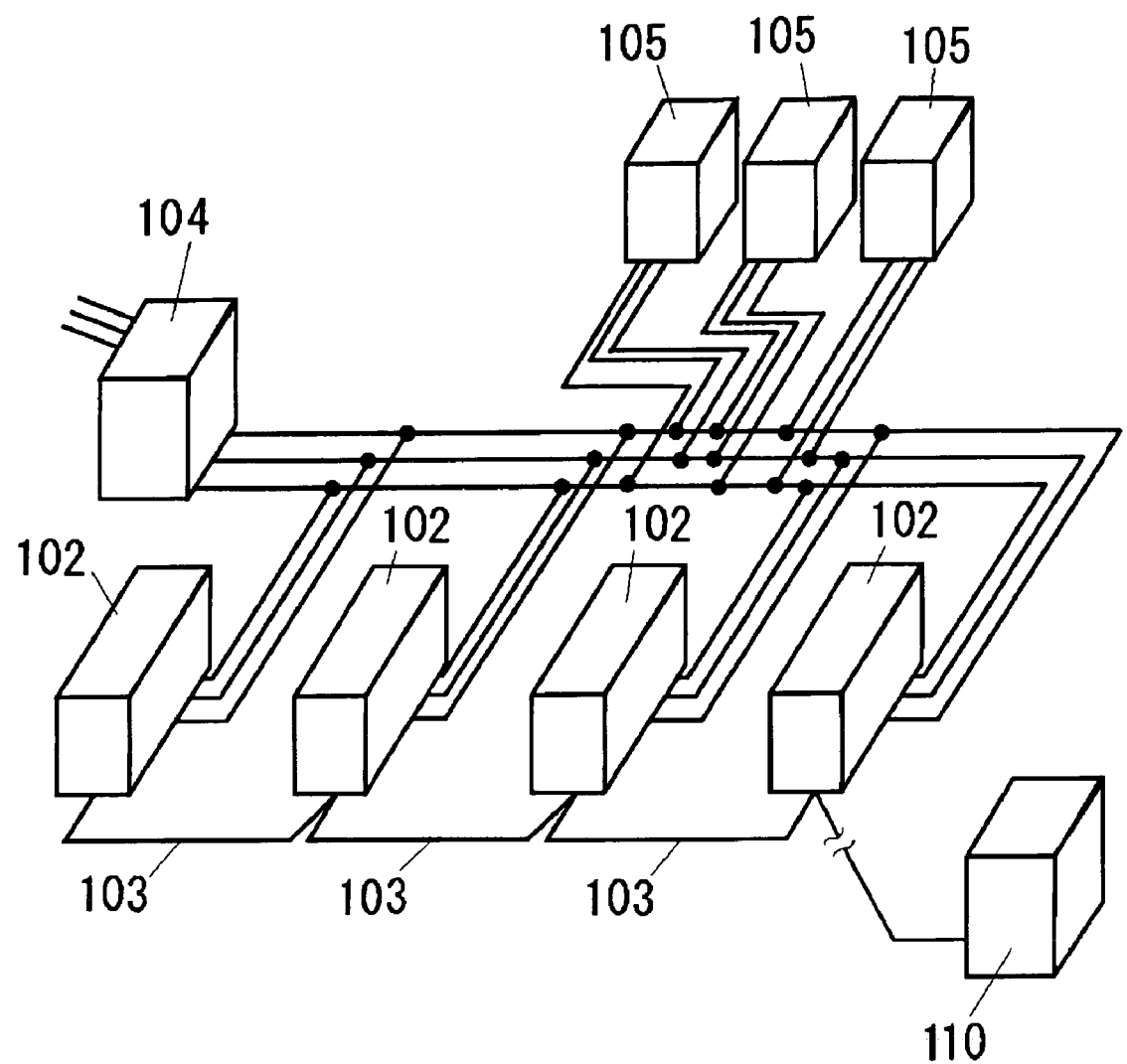
FIG. 14 is a mimetic diagram showing a whole construction of a generator for distributed power supplies.

In FIG. 14, the output power line of each of the electric power plants 102 is connected to the external (commercial or another) electric power system 104. Each of the loads 105 is connected to the external electric power system 104 interconnecting with the output power lines of the electric power plants 102.

Therefore, the loads 105 are supplied with output electric power generated by the electric power plants 102. If the electric power required by the operating loads 105 exceeds the output electric power of the electric power plants 102, the external electric power system 104 compensates for the shortage of electric power, thereby surely supplying electric power to the loads 105.

The electric power plants 102 may be used as co-generators.

The co-generator has an internal combustion engine for generating heat and for driving a generator so as to generate electric power. Cooling water is induced into the internal combustion engine so as to extract the heat generated by the internal combustion engine. The extracted heated water is stored in a hot water tank or the like. When the electric power plants 102 serve as co-generators, electric power to the loads 105 is mainly supplied by the electric power plants 102. If the electric power required by the loads 105 exceeds the output power of the electric power plants 102, the external electric power system supplies the deficient electric power to the loads 105.

Accordingly, it stably provides both storage of hot water and generation of electric power for the loads 105.

Figure 15:
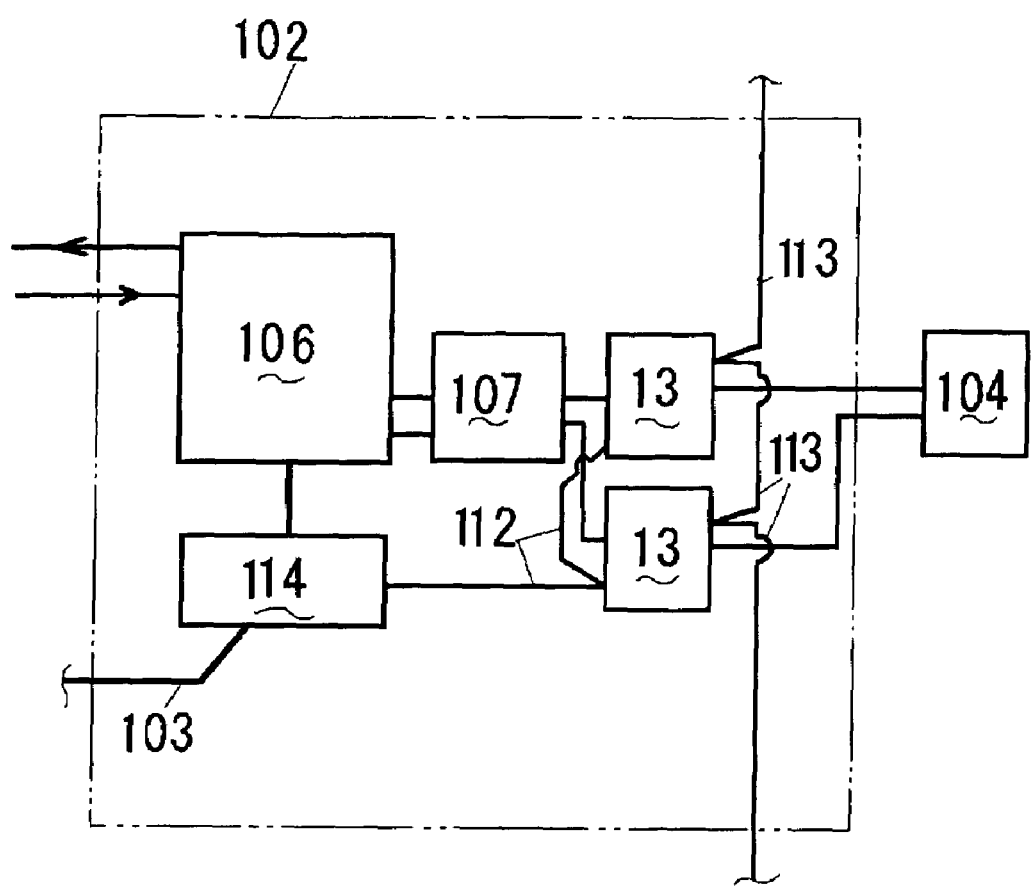
FIG. 15 is a drawing showing a construction of an electric power plan.

Next, description will now be given on the construction of the electric power plant 102 in accordance with FIG. 15.

The electric power plant 102 comprises a prime mover 106, a generator 107 and inverter circuits 13.

The prime mover 106 is connected to the generator 107 so as to drive the generator 107. Cooling water may be induced into the prime mover 106 so as to extract heat generated by the prime mover 106.

A generator control system controller 114 including an engine controller is connected to the prime mover 106 through a communication line 112 so as to serve as a unit for controlling the generator system. Therefore, the system controller 114 has the same function as the controller 12 of the first embodiment.

In the electric power plant 102, the communication line 112 is connected to the system controller 114 and the inverter circuits 13 so as to transmit signals for controlling the inverter circuits 13 and signals for indicating the statuses of the inverter circuits 13, thereby controlling the inverter circuits 13 through the system controller 114.

The communication line 103 which connects the electric power plants 102 mutually is connected to the system controller 114. The signal for controlling each of the prime movers 106 is transmitted to each of the system controllers 114 through the communication line 103.

The inverter circuit 13 is connected to the generator 107. Alternating current output power generated by the generator 107 is converted into direct-current electric power, and is inputted to the inverter circuit 13 so as to be outputted as alternating current electric power having a controlled frequency.

In the inverter circuit 13 is disposed a controller for controlling the frequency of alternating current electric power and for another.

A plurality of the inverter circuits 13 may be connected to the generator 107 so as to supply electric power independently.

The above-mentioned communication line 113 is connected to the controllers disposed within the respective inverter circuits 13.

All of the inverter circuits 13 disposed within the electric power plants 102 are connected mutually through the communication line 113.

Each of the inverter circuits 13 detects the driving state of the electric power plant 102, existence of the abnormalities in the electric power plant 102, input voltage and current from the generator 107, output voltage and current of the inverter circuit 13, and integral power consumption of the inverter circuit 13.

The information detected by the inverter circuit 13 is transmitted to the communication lines 113 and 103 through the system controller 114 as communication data. The communication data is transmitted to the other electric power plants 102 through the communication line 103. In the case that the management system 110 is connected to the power generation system, the information of the inverter circuit 13 can be transmitted to the management system 110.

The above-mentioned informations of all the electric power plants 102 (including the information of their inverters) are transmitted to the management system 110 through the communication line 103. Accordingly, the management system 110 recognizes the informations of the inverter circuits 13, that is, their input voltage, input current, output voltage and output current, and provides these informations for meter-display which shows the state of the power generation system or provides them as energy management data, such as daily report of power generation.

Namely, the information of each of the electric power plants 102 is detected by the inverter circuits 13 disposed within the electric power plants 102, and this information is transmitted as communication signals to the system controller 114 for controlling the generator system through the communication line 103. The information is further transmitted from the system controller 114 to the management system 110. At the management system 110, the information of each of the electric power plants 102 is used as information for management. The application of the information of the electric power plants 102 as management information by the management system 110 is not specified. The minimum requirement for the management system 110 is to recognize and store the information of the electric power plants 102 and to manage the electric power plants 102 by using the stored information.

Figure 16:
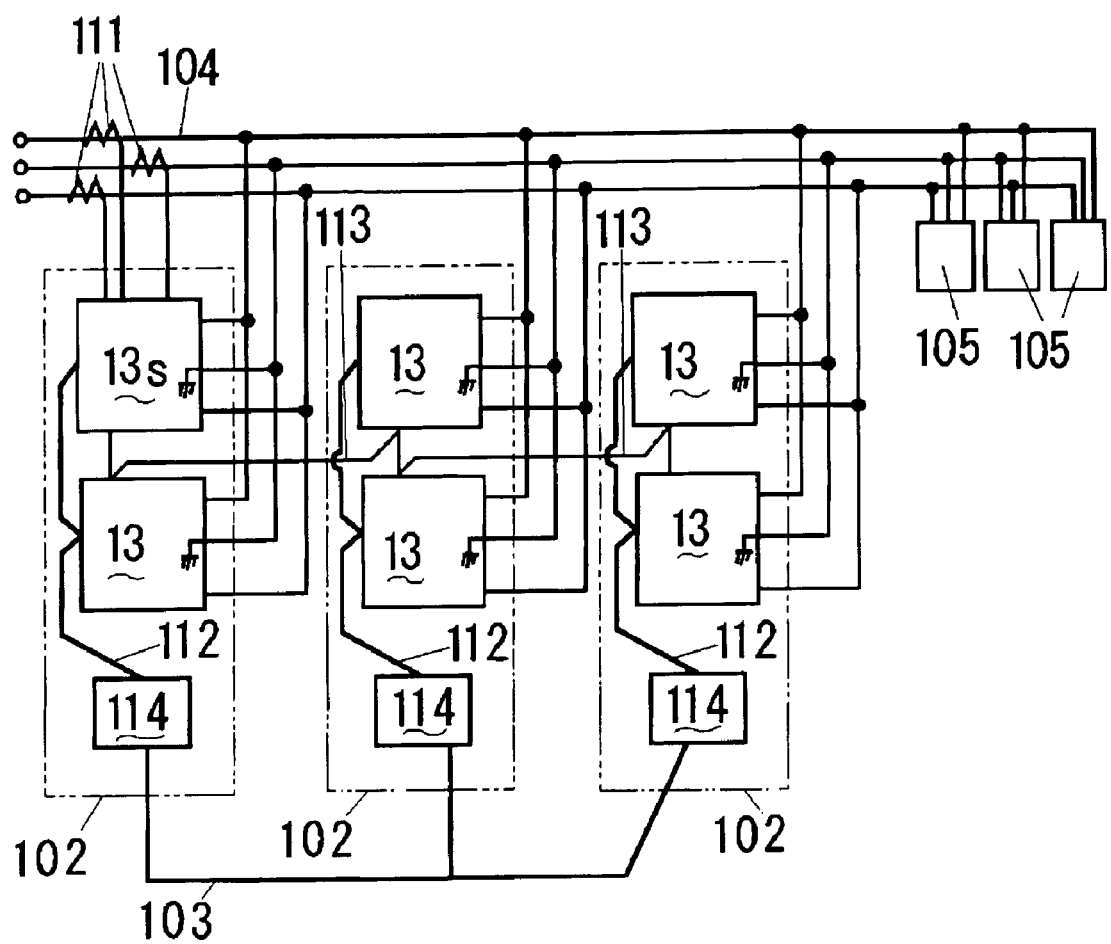
FIG. 16 illustrates a connection construction of inverter circuits disposed in multiple electric power plants.

Next, description will be given on the interconnection of the multiple inverter circuits 13 in accordance with FIG. 16.

The inverter circuits 13 are interconnected mutually through the communication lines 113.

According to the invention, each of the communication lines 113 is connected to the inverter circuits 13 by a multidrop style. The communication line 113 connects any two adjoining inverter circuits 13 to each other.

Measuring devices 111 for recognizing the amount of electric power supply from the external electric power system 104 are connected to one of the multidrop-connected inverter circuits 13.

Measuring devices 111 are disposed on the lines of the external electric power system 104 to the loads 105 on the upstream side of the junctions of the lines with the inverter circuits 13 (toward the external electric power system 104).

The measuring devices 111 detect the amount of electric power supplied from the external electric power system 104 to the loads 105.

When the generator system is stopped and the loads 105 are connected to the external electric power system 104, the measuring devices 111 essentially detect supply of electric power from the external electric power system 104 to the loads 105. If the measuring devices 111 detect no supply of electric power in this situation, service interruption of the external electric power system 104 may be considered. Therefore, the measuring devices 111 is available for finding service interruption of the external electric power system 104.

When the generator systems are operating, the number of the electric power plants 102 to be operated is found by the measuring devices 111. When supply of electric power from the electric power plants 102 is insufficient to the loads, the considerable amount of electric power is supplied from the external electric power system 104. When supply of electric power from the electric power plants 102 is enough to the loads, the amount of electric power supplied from the external electric power system 104 decreases. Accordingly, the measuring devices 111 are used for recognizing the amount of electric power supplied from the external electric power system 104 and for decide the number of the generator systems to be operated.

Current transformers or the like are available to be used as the measuring devices 111.

An inverter circuit 13$s$ connected to the measuring devices 111 regulates outputs of the other inverter circuits 13 constituting the generator systems. As the above mentioned, the communication lines 113 are connected between the inverter circuits 13. The inverter circuit 13$s$ connected to the measuring devices 111 receives signals transmitted through the communication lines 113 so as to recognize the number of the other inverter circuits 13 connected to the communication lines 113.

Accordingly, the communication lines 113 are used for recognition of output powers of the inverter circuits 13 and for controlling the output powers of the inverter circuits 13.

The amount of electric power supplied from the external electric power system 104 is kept constant by the inverter circuit 13$s$. In the inverter circuit 13$s$, the predetermined amount of electric power supplied from the external electric power system 104 is set, and the inverter circuit 13$s$ controls output powers of the other inverter circuits 13 so that the amount of electric power measured by the measuring instruments 111 becomes equal to the predetermined amount.

Accordingly, the inverter circuit 13$s$ calculates the required output power for keeping the constant amount of electric power supplied from the external electric power system 104. The calculated output power is divided among the operating inverter circuits 13.

The output powers allotted to the respective operating inverter circuits 13 may be evened. In this case, load is equally shared among the inverter circuits 13 so that the load is prevented from concentrating on one or more particular inverter circuits 13 of them, thereby prolonging the life of the whole of the system.

Alternatively, some of the operating inverter circuits 13 may be provided with larger allotted output powers, and other with smaller output powers.

The operating inverter circuits 13 may be ranked on the priority order about allocation of output power based on the respective operating times of the inverter circuits 13. Corresponding to the required output power, the number of the inverter circuits 13 to be operated is calculated and which of the inverter circuits 13 is operated is decided.

Figure 17:
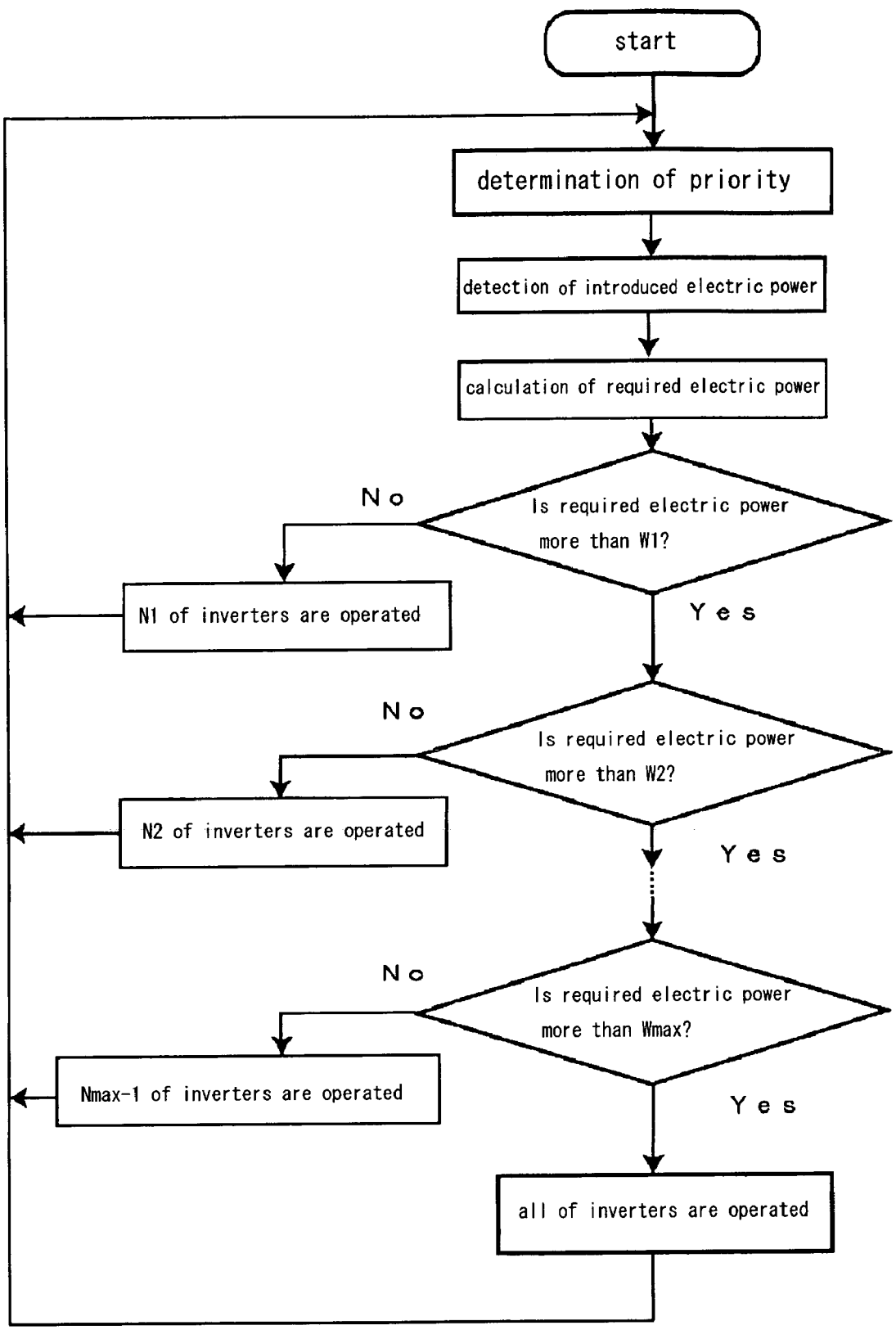
FIG. 17 is a flow chart showing the control construction of the inverter circuits.

Description will be given on an example of allocation of operation to the inverter circuits 13 in according with FIG. 17.

First, the priority order of the inverter circuits 13 is determined, and the value of electric power introduced from the external electric power system 104 is recognized based on the current amounts detected by the measuring devices 111.

Then, based on the introduced electric power, required electric power for the generator system is calculated. Accordingly, the number of the inverter circuits 13 to be operated by the required electric power is set up.

For example, output power levels of the whole generator system up to the maximum are ranked into W1, W2 to $W_{max}$, (over $W_{max}$). Then, the number of the inverters to be operated, such as N1, N2, to $N_{max}{}^{31}$ 1, $N_{max}$, is allotted to the respective ranked output powers.

The required electric power is compared with the set-up output stages up to over $W_{max}$, so as to decide the number of the inverters operated.

In this example, each of the inverter circuit 13 is provided with a timer for integrating operating times of the inverter circuit 13 so as to be used for recognition of the operating time of the inverter circuit 13.

According to this, the inverter circuit 13 whose operation time is short is operated preferentially so as to equalize the integrated load value among the inverter circuits 13 of the generator system, thereby improving durability of the inverter circuits.

Namely, the priority order of the inverter circuits 13 to be operated is determined based on their operating times so as to preferentially operate the inverter whose operation time is short.

At the time of installation of the generator system, the output power levels are ranked according to an initial priority order.

For example, when the required output power is sufficiently smaller than the total of normal output powers of the set inverters, some of inverters are operated according to the priority and the other inverters are stopped.

In each of the operated inverters, the timer integrates operating time of the inverter. The priority of these operated inverters falls based on the integrated operating time. At the next operation control, these inverters are not operated preferentially, or these inverters are stopped preferentially.

With regard to the output control of the inverters, control of operation or stop for the multiple inverters is updated based on the cycle set up in the inverter circuit 13$s$. At the time of updating the control for changing the inverters to be operated, the operation of the inverter to be operated is prior to the stopping of another inverter so as to reduce fluctuation of output power.

Alternatively, the stopping of one inverter may be prior to the starting of operation of another inverter. In this case, the fluctuation of electric power caused by change of operation between the inverters can be absorbed by supply of electric power from the external electric power source.

Furthermore, outputting of electric power may be planned according to patterns of outputting electric power at respective time periods. The trend of outputting electric power is integrated in the period of one day, one week, or one month, so as to serve as the patterns of outputting electric power at respective time periods.

In the inverter circuit 13$s$, the number of the inverters to be operated corresponding to respective required values of electric power is memorized as a data. Therefore, based on comparison of this data with the patterns of outputting electric power at the respective time periods, the inverters to be operated can be determined previously. As mentioned above, the inverters to be operated are determined according to the priority order of the inverter circuits set up previously.

First, the inverters with a high priority are operated. Before the time period of the peak of electric power consumption, the inverters planned to operate at the peak are started. The amount of electric power required at the time is equally shared among the started inverters, and the electric power is supplied.

When reduction of required electric power is expected, the inverters with a low priority are stopped preferentially, and electric power required at the time is paid by the other inverters.

As mentioned above, by control of the multiple inverters, electric power can be supplied smoothly by the generator system. Furthermore, many inverters are not needed to supply electric power corresponding to a little electric power requirement. Accordingly, the fluctuation of electric power supplied by the adjustment of output of the inverters is inhibited so as to reduce loss of electric power of the inverters.

The inverter circuit 13s connected to the measuring devices 111 recognizes occurrence of power failure and the required operational amount of the power generation system. Further, due to the communication lines 113 connecting the respective other inverter circuits 13 to the inverter circuit 13s, the inverter circuit 13s also recognizes the driving statuses of the other inverter circuits 13.

Accordingly, the operation status of the power generation system can be recognized through the inverter circuits 13 connected with the communication lines 113. By connecting the management system 110 or the system controller 114 to the inverter circuit 13s, the generator system can be managed easily.

By using the management system 110 or the system controller 114, it is unnecessary to connect the communication lines 103 to the respective inverter circuits 13, thereby reducing wiring work and simplifying wiring structure so as to facilitate maintenance work.

Next, the connection construction of the inverter circuits 13 in the multidrop style will be more detailed.

When three inverter circuits 13 are connected in the multidrop style, the first inverter circuit 13 and the second inverter circuit 13 are connected mutually, and the second inverter circuit 13 and the third inverter circuit 13 are connected mutually. When the fourth inverter circuit 13 is connected further, the third inverter circuit 13 and the fourth inverter circuit 13 are connected mutually through the communication line 113.

Since each of the communication lines 113 is connected between adjoining two inverter circuits 13, the wiring is omissible. With regard to the above-mentioned connection of three inverters, the second inverter circuit 13 transmits information to the first inverter circuit 13 through the communication line 113 connecting the first inverter circuit 13 with the second inverter circuit 13.

The third inverter circuit 13 transmits information to the first inverter circuit 13 through the communication line 113 connecting the second inverter circuit 13 with the third inverter circuit 13 and the communication line 113 connecting the first inverter circuit 13 with the second inverter circuit 13.

In this way, the communication line 113 connecting the first inverter circuit 13 with the second inverter circuit 13 is used in common so as to save the wiring of another communication line 113.

Namely, the multidrop connection of the inverter circuits 13 saves wiring between the generator system control unit and the interconnected inverters. The respective inverter circuits 13 constituting the respective generator systems are connected to one of the inverter circuits 13 so as to constitute the power generation system, thereby enabling picking up the informations of the respective inverter circuits 13.

Figure 18:
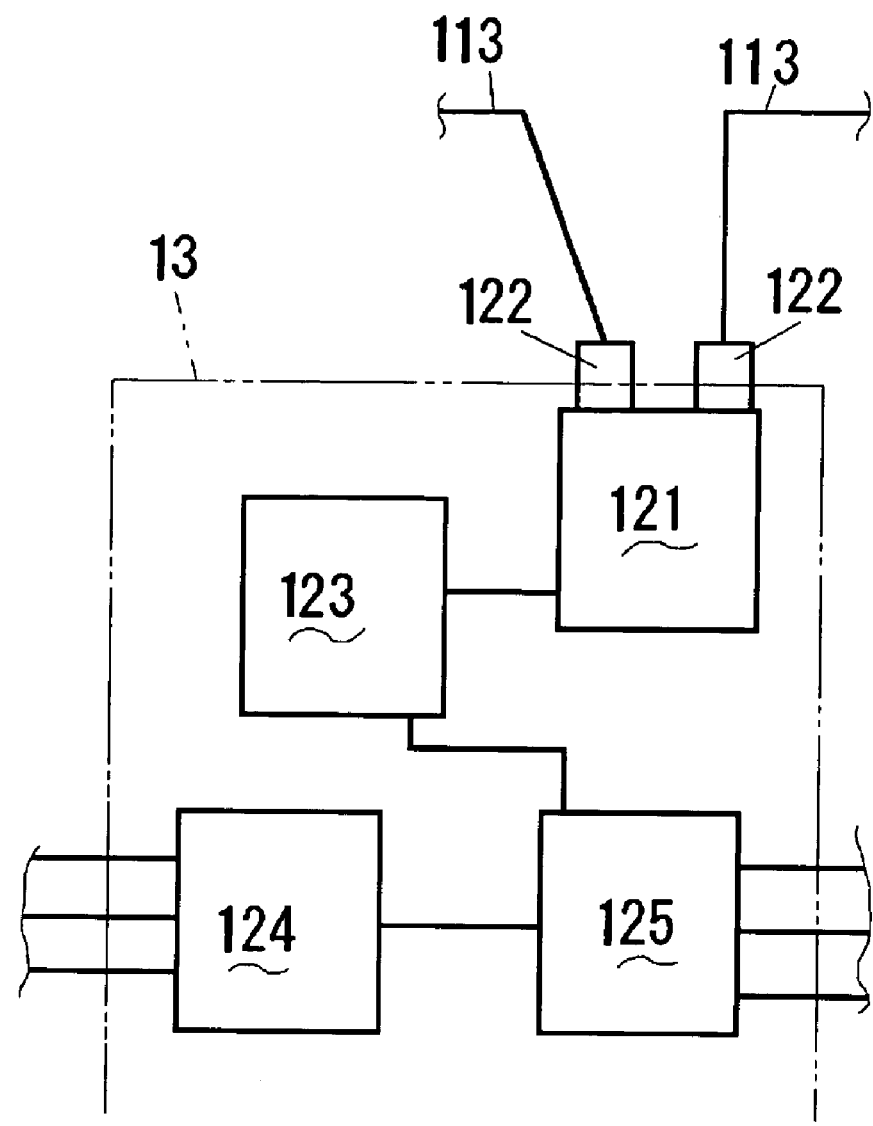
FIG. 18 illustrates the construction of the inverter circuit.

Next, description will be given on the construction of the inverter circuit 13 in accordance with FIG. 18.

The inverter circuit 13 comprises a controller 123, a rectifying circuit 124, a frequency controller 125 and a communication section 121.

Alternating-current power generated by the generator is converted to direct-current power through the rectifying circuit 124, and this direct-current power is supplied to the frequency controller 125. The frequency controller 125 converts the direct-current electric power into alternating-current power, and outputs it.

The controller 123 is connected to the frequency controller 125 so as to control the electric power outputted from the frequency controller 125.

The communication section 121 is connected to the controller 123 so hat the controller 123 may transmit the status information of the inverter circuit 13 through the communication section 121. The controller 123 also deceives the signal for controlling the inverter circuit 13 so as to control the output of the inverter circuit 13.

Two connection ports 122 to be connected to respective communication lines 113 are disposed within the communication section 121. When the multiple inverter circuits 13 are interconnected through the communication lines 113, each of the inverter circuit 13 is provided with the communication lines 113 connected to the respective connection ports 22 thereof so as to be connected to two opposite inverter circuits 13 adjoining thereto.

Namely, each of the connection ports 122 of the inverter circuit 13 is provided for connecting the communication line 113 to the inverter circuit 13, and for connecting the communication line 113 to another communication line 113.

Accordingly, the connection construction of the communication line 113 between the inverter circuits 13 is simplified so as to reducing manpower for connecting, and the distance between the communication lines are shortened so as to reduce the attenuation factor of distributed signals, thereby ensuring higher-density communication.

Further, in each of the electric power plants 102, the communication section 131 of each of the inverter circuits 13 is provided with ports to be connected to the respective communication lines 112 so that the inverter circuits 13 are connected to the system controller 114.

Next, description will be given on the connection construction of the prime mover 106 disposed within the electric power plant 102.

The multiple prime movers 106 disposed in the respective generator systems are connected mutually through the respective system controllers 114 and the communication lines 103.

The mutually interconnection of the system controllers 114 using the communication lines 103 employs the multi-drop system similarly with the above-mentioned connection of inverter circuits 13. Accordingly, in the generator systems, wirings among the interconnected prime movers 106 are reduced. The respective system controllers 114 constituting the respective generator systems are connected to selected one of the system controllers 114 so as to constitute the power generation system, so that the informations of the respective prime movers 106 are transmitted to the selected system controller 114 and the selected system controller 114 controls the respective prime movers 106 independently.

In each of the electric power plants 102 interconnected mutually through the communication lines 103, each communication line 103 branches into the communication line 112 through the system controller 114. Therefore, the connection of communication lines 103 among the electric power plants 102 and the construction of the power generation system are simplified so as to reduce man power for wiring and improve the maintainability.

The communication line 112 is connected to the system controller 114 including a controller for the prime mover 106 so as to control the starting, stopping and outputting of the prime mover 106. A battery disposed within the electric power plant 102 or electric power from the external electric power source can be used for supplying electric power to a starter for starting the prime mover 106.

The connection of the communication line 112 to the system controller 114 including the controller for the prime mover 106 enables the starting and stopping control of the electric power plant 102 and the output control of the prime mover 106.

With regard to the generator systems, the prime mover 106 disposed within the above-mentioned electric power plant 102 having the inverter circuit 13s for controlling the inverter circuits 13 is connected with the controller for controlling the prime mover 106. This controller receives informations of the other prime movers 106 from the other controllers for the other prime movers 106, and transmits control signals to the respective controllers.

The controllers for the prime movers 106 are interconnected in the multidrop style. The controllers of adjoining prime movers 106 are connected mutually through the communication line 112. Due to this, the communication wiring can be constructed simply, and the distance of the communication line 112 between the controllers can be shortened, thereby reducing attenuation of the signals transmitted and received between the controllers.

The multiple prime movers 106 disposed in the respective generator systems are interconnected so as to be collectively controlled in their outputting, similarly with the above-mentioned interconnected inverter circuits 13.

The electric power plant 102 having the inverter circuit 13s (the system controller 114 connected to the prime mover 106 therein) transmits the controlling informations to the other respective prime movers 106 and collects the driving information of the engines. The electric power plant 102 for transmitting and collecting the informations ranks the other electric power plants 102 in the priority order, and controls the operation statuses of engines according to the priority order. Namely, the system controller 114 connected to the prime mover 106 is applicable for controlling the respective output powers of the engines so as to evenly share the load among the prime movers 106, or for selecting some prime movers 106 corresponding to the load and driving them so as to ensure efficiency of outputting.

A construction for communication among the system controllers 114 provided to the prime movers 106 will now be exemplified.

This is an example of construction for communication among the electric power plants 102, but the construction is not limited to this example. What is necessary is just that information of each of the multiple interconnected engines is transmitted to the system controller of the terminal electric power plant.

When information is transmitted from the system controller 114 connected to the prime mover 106, first, whether the signal from another system controller 114 connected to the prime mover 106 is transmitted to the communication line 103 or not is investigated. When no signal from another system controller 114 is transmitted, the system controller 114 transmits the signal to the communication line 103. Such a simple construction is provided for transmitting information among the prime movers 106.

The previously selected system controller 114 connected to the prime mover 106 transmits a signal for starting communication. The signal is received by the interconnected prime movers 106 in order from the upstream side (toward the management system 110), and in response to the received signals, informations are transmitted from the respective prime movers 106. According to this communication construction, information is transmitted and received stably.

This construction for communication is adaptable for the inverter circuits 13.

Namely, the electric power plant 102 connected with the measuring devices 111 serves as a parent plant, in which the prime movers 106 and the inverter circuits 13 controls the prime movers 106 and the inverter circuits 13 in the other respective electric power plants 102. What is necessary is just that information of each of the multiple interconnected inverter circuits is transmitted to the terminal inverter circuit.

When information is transmitted from the inverter 13, first, whether a signal from another inverter 13 is transmitted to the communication line 103 or not is investigated. When no other signal is transmitted, after waiting for transmission for a while, whether a signal from another inverter 13 is transmitted or not is investigated again.

Such a simple construction is applicable for transmitting information among the prime movers 106.

The management system 110 transmits a signal for starting communication, and the signal is received by the connected inverter circuits 13 in order from the upstream side (toward the management system 110), and in response to the received signal from the management system 110, information is transmitted from the respective inverter circuits 13.

Any number of the electric power plants 102 is appreciated to be connected to the parent plant on the most upstream side so as to be controlled by the parent plant.

In the case that the multiple inverter circuits 13 are connected to the management system 110, the inverter circuit 13 nearest to the management system 110 is referred to as a first inverter circuit, the inverter circuit 13 secondly near to the management system 110 as a second inverter circuit, and so on. When the management system 110 transmits the signal for starting communication, information of the first inverter circuit 13 is sent to the management system 110. When the management system 110 transmits the signal for starting communication again, information of the second inverter circuit 13 is sent to the management system 110.

Due to this construction, only signals required for management of the system are transmitted to the management system 110, thereby improving the communication efficiency so as to ensure stable transmission and reception of information and stable control of the inverter circuits.

Next, description will be given on the construction for controlling the prime movers 106 and the inverter circuits 13.

According to this example, as the above mentioned, the inverter circuits 13 are controlled, and the outputs of the inverter circuits 13 are controlled if needed. Also, with regard to the prime movers 106, outputs are controlled or operation is allotted corresponding to the required output.

In each of the electric power plants 102, when the prime mover 106 is stopped, the inverter circuits 13 also stop their outputting. In the power generation system, when some of the electric power plants 102 are stopped, output is allotted to the inverter circuits 13 in operation.

One of the inverter circuits 13 recognizes the number of the inverter circuits 13 which are operated or ready to be operated, and computes allocation of output to the inverter circuits 13 based on the recognized number. Then, the allocation of output to the respective inverter circuits 13 is transmitted so as to control the inverter circuits 13.

Namely, each of the inverter circuits 13 which are ready to be operated has allocation of output based on the number of the inverter circuits 13 which are ready to be operated, and is controlled in its output.

The system controller 114 for controlling the prime mover 106 is also applicable for recognizing the output status of the inverter circuits 13 through the communication lines 112. Therefore, the system controller 114 is applicable for starting the prime mover 106 in stationary when the output power of operated inverter circuits 13 reaches or exceeds a fixed value.

In each of the electric power plant 102, driving operation of the prime mover 106 brings the inverter circuits 13 into preparation state for operation.

By bringing the inverter circuits 13 into preparation state for operation, said one of the inverter circuit 13 recognizes the increased number of the inverter circuits 13 which are ready to be operated, and allots output to the inverter circuits 13 in the above-mentioned manner.

Furthermore, when output electric power of the inverter circuits 13 in the operation state becomes less than the fixed value, the system controller 114 may stop some of the prime movers 106 in the operation state.

In each of the electric power plant 102, stop of the prime mover 106 leads to stopping of output of the inverter circuits 13. Because of the stopping of the inverter circuits 13, another circuit 13 recognizes reduction of the number of inverter circuits 13 in preparation for operation. Based on this reduced number of the inverter circuits 13, the selected inverter circuit 13s allots output to the inverter circuits 13 as mentioned above.

As mentioned above, the power generation system is efficiently operated by controlling the operation of the generator equipments 2 and the operation status of the inverter circuits 13 so as to save fuel consumption of the electric power plants 102 and prolong lives of the inverter circuits 13.

INDUSTRIAL APPLICABILITY

As mentioned above, an electric power system having generators driven by engines according to the invention is useful for supplying electric power to a factory, a commercial plant, or a house. The electric power system is also adaptable to a co-generation system so as to recover heat generated from its prime movers. Furthermore, the electric power system is useful for supplying electric power to a plant using a plurality of electric power systems.

What is claimed is:

1. An electric power system for supplying alternating current electric power comprising:
    a single generator driven by an engine;
    a plurality of power generation sections disposed within the single generator, each power generation section including a plurality of armature windings;
    a plurality of inverter circuits provided one for each of the respective armature windings;
    an independent power generation electric wire connected to the downstream sides of the respective inverter circuits and connected to an external wire which connects an external alternating current electric power source to a consumer;
    means for detecting alternating current (AC) voltage in the external wire;
    means for detecting voltages outputted from the respective inverter circuits;
    means for detecting currents outputted from the respective inverter circuits; and
    a controller for controlling the respective inverter circuits based on the AC voltage in the external wire, the voltages in the respective inverter circuits, and the currents in the respective inverter circuits.

2. The electric power system as set forth in claim 1, further comprising:
    means for detecting current in the external wire; and
    a controller for calculating electric powers to be outputted from the respective inverter circuits based on the voltages in the respective inverter circuits and the currents in the respective inverter circuits, wherein a main controller communicates with the respective controllers, the main controller for the electric power in the external wire and the output power of the respective inverter circuits communicates with the respective controllers, and controls the respective inverter circuits based on the electric power in the external wire and the output electric powers of the respective inverter circuits so as to equalize the independent output electric powers of the respective inverter circuits.

3. The electric power system as set forth in claim 2, wherein the main controller controls the respective inverter circuits so as to make current in the external wire flow to the consumer.

4. The electric power system as set forth in claim 3, wherein the main controller communicates with each of the controllers through a line of multidrop connection.

5. A generation system including a plurality of the electric power systems according to claim 4, comprising:
    system controllers for controlling start and stop of the respective electric power systems; and
    a main system controller for calculating electric power of the external wire based on voltage and current in the external wire, wherein the main system circuit controller communicates with the respective system controllers and controls the respective systems based on the electric power in the external wire so as to equalize total operation status of the respective systems.

6. The electric power system as set forth in claim 2, wherein the main controller communicates with each of the controllers through a line of multidrop connection.

7. A generation system including a plurality of the electric power systems according to claim 6, comprising:
    system controllers for controlling start and stop of the respective electric power systems; and
    a main system controller for calculating electric power of the external wire based on voltage and current in the external wire, wherein the main system circuit controller communicates with the respective system controllers and controls the respective systems based on the electric power in the external wire so as to equalize total operation status of the respective systems.

8. A generation system including a plurality of the electric power systems according to claim 2, comprising:
   system controllers for controlling start and stop of the respective electric power systems; and
   a main system controller for calculating electric power of the external wire based on voltage and current in the external wire, wherein the main system circuit controller communicates with the respective system controllers and controls the respective systems based on the electric power in the external wire so as to equalize total operation status of the respective systems.

9. A generation system including a plurality of the electric power systems according to claim 3, comprising:
   system controllers for controlling start and stop of the respective electric power systems; and
   a main system controller for calculating electric power of the external wire based on voltage and current in the external wire, wherein the main system circuit controller communicates with the respective system controllers and controls the respective systems based on the electric power in the external wire so as to equalize total operation status of the respective systems.

10. A generation system including a plurality of the electric power systems according to claim 1, comprising:
    system controllers for controlling start and stop of the respective electric power systems; and
    a main system controller for calculating electric power of the external wire based on voltage and current in the external wire, wherein the main system circuit controller communicates with the respective system controllers and controls the respective systems based on the electric power in the external wire so as to equalize total operation status of the respective systems.

11. An electric power system comprising:
    a single generator driven by an engine;
    a plurality of armature windings disposed within the single generator;
    inverter circuits provided to each of the respective armature windings;
    an independent power generation electric wire connected to the downstream sides of the respective inverter circuits and connected to an external wire which connects an external electric power source to a consumer;
    means for detecting voltage in the external wire;
    means for detecting current in the external wire;
    means for detecting voltages outputted from the respective inverter circuits;
    means for detecting currents outputted from the respective inverter circuits;
    a plurality of controllers for controlling the respective inverter circuits based on the voltage in the external wire, the voltages outputted from the respective inverter circuits, and the currents outputted from the respective inverter circuits; and
    a main controller for the electric power in the external wire and the output powers of the respective inverter circuits, wherein the main controller calculates electric powers to be outputted from the respective inverter circuits based on the voltages outputted from the respective inverter circuits and the currents outputted from the respective inverter circuits, and wherein the main controller communicates with the respective controllers and controls the respective inverter circuits based on the electric power in the external wire and the output electric powers of the respective inverter circuits so as to equalize the independent output electric powers of the respective inverter circuits.

12. The electric power system as set forth in claim 11, wherein the main controller controls the respective inverter circuits so as to make current in the external wire flow to the consumer.

13. The electric power system as set forth in claim 12, wherein the main controller communicates with each of the controllers through a line of multidrop connection.

14. A generation system including a plurality of the electric power systems according to claim 11, comprising:
    system controllers for controlling start and stop of the respective electric power systems; and
    a main system controller for calculating electric power of the external wire based on voltage and current in the external wire, wherein the main system circuit controller communicates with the respective system controllers and controls the respective systems based on the electric power in the external wire so as to equalize total operation status of the respective systems.

15. An electric power system for supplying alternating current electric power comprising:
    a single generator driven by an engine;
    a plurality of armature windings disposed within the single generator;
    a plurality of inverter circuits provided to each of the respective armature windings so as to convert electric power from the respective armature windings into alternating current power synchronized with an external electric power source;
    an independent power generation electric wire connected to the downstream sides of the respective inverter circuits and connected to an external wire which connects the external alternating current electric power source to a consumer;
    means for detecting alternating current (AC) voltage in the external wire;
    means for detecting voltages outputted from the respective inverter circuits;
    means for detecting currents outputted from the respective inverter circuits;
    a plurality of controllers for controlling the respective inverter circuits based on the AC voltage in the external wire, the voltages in the respective inverter circuits, and the currents in the respective inverter circuits; and
    a main controller for the electric power in the external wire and the output power of the respective inverter circuits, wherein the main controller communicates with the respective controllers, and controls the respective inverter circuits so as to equalize the independent output electric powers of the respective inverter circuits.

* * * * *